(12) United States Patent
Lucky et al.

(10) Patent No.: US 11,632,166 B2
(45) Date of Patent: Apr. 18, 2023

(54) NEIGHBOR CELL LIST

(71) Applicant: QUALCOMM Incorporated, San Diego, CA (US)

(72) Inventors: Kundan Kumar Lucky, Bangalore (IN); Gene Marsh, Encinitas, CA (US); Fatih Ulupinar, San Diego, CA (US); Dan Vassilovski, Del Mar, CA (US); Rohit Kapoor, Bangalore (IN); Rajeev Kumar, Bangalore (IN); Faris Rassam, El Cajon, CA (US)

(73) Assignee: QUALCOMM Incorporated, San Diego, CA (US)

( * ) Notice: Subject to any disclaimer, the term of this patent is extended or adjusted under 35 U.S.C. 154(b) by 118 days.

(21) Appl. No.: 16/331,945

(22) PCT Filed: Sep. 1, 2017

(86) PCT No.: PCT/US2017/049928
§ 371 (c)(1),
(2) Date: Mar. 8, 2019

(87) PCT Pub. No.: WO2018/052744
PCT Pub. Date: Mar. 22, 2018

(65) Prior Publication Data
US 2019/0245614 A1   Aug. 8, 2019

(30) Foreign Application Priority Data

Sep. 13, 2016 (IN) .............................. 201641031251
Nov. 21, 2016 (IN) .............................. 201644039659

(51) Int. Cl.
*H04B 7/185*   (2006.01)
*H04W 48/16*   (2009.01)
(Continued)

(52) U.S. Cl.
CPC ......... *H04B 7/18541* (2013.01); *H04B 7/185* (2013.01); *H04B 7/204* (2013.01);
(Continued)

(58) Field of Classification Search
None
See application file for complete search history.

(56) References Cited

U.S. PATENT DOCUMENTS 5,559,806 A    9/1996  Kurby et al.
5,642,358 A *  6/1997  Dent ...................... H01Q 1/288
                                              342/51
(Continued)

FOREIGN PATENT DOCUMENTS

CN     1124082 A     6/1996
CN   101536585 A     9/2009
(Continued)

OTHER PUBLICATIONS

U.S. Appl. No. 62/156,063 to Ulupinar et al., "Handover for Non-Geosynchronous Satellite Communication" filed May 1, 2015, Fig. 1, 9 and corresponding disclosure.*
(Continued)

*Primary Examiner* — Gregory B Sefcheck
(74) *Attorney, Agent, or Firm* — Loza & Loza, LLP

(57) ABSTRACT

The disclosure relates in some aspects to enabling a user terminal (UT) to obtain information about nearby cells and any beams generated by nearby cells. For example, a network can send a neighbor cell list to UTs, where the list identifies the cells in that neighborhood and provides information about any beams generated by those cells. Thus, a UT can learn the neighboring beams/cells that the UT can reselect to if the current beam/cell becomes weak. In some aspects, the UE can learn the attitude (e.g., pitch, roll, yaw, or any combination thereof) profile of neighboring satellites
(Continued)

as well as the pointing angles and the ON-OFF schedules of their beams. In some aspects, the UT can learn a start angle and a span for a satellite and use this information to identify a satellite the UT can reselect to if the current beam/cell becomes weak.

27 Claims, 24 Drawing Sheets

(51) Int. Cl.
 *H04B 7/204* (2006.01)
 *H04W 36/00* (2009.01)
(52) U.S. Cl.
 CPC ...... *H04B 7/2041* (2013.01); *H04W 36/0061* (2013.01); *H04W 48/16* (2013.01)

(56) References Cited

U.S. PATENT DOCUMENTS

| | | | |
|---|---|---|---|
| 5,678,184 A | 10/1997 | Cutler, Jr. et al. | |
| 5,768,266 A * | 6/1998 | Thompson | H04B 7/18539 370/321 |
| 5,819,185 A * | 10/1998 | Umezawa | H01Q 3/06 455/575.1 |
| 5,999,797 A | 12/1999 | Zancho et al. | |
| 6,023,242 A * | 2/2000 | Dixon | H01Q 21/065 342/359 |
| 6,034,634 A * | 3/2000 | Karlsson | H04B 7/18571 342/359 |
| 6,070,050 A * | 5/2000 | Penny, Jr. | H04B 7/1855 455/12.1 |
| 6,157,621 A * | 12/2000 | Brown | H01Q 1/242 370/310 |
| 6,195,037 B1 * | 2/2001 | Gross | H04B 7/2041 342/354 |
| 6,208,858 B1 | 3/2001 | Antonio et al. | |
| 6,421,526 B1 * | 7/2002 | Banno | H01Q 3/24 455/13.1 |
| 6,512,920 B1 * | 1/2003 | Yaoya | H04B 7/18541 455/427 |
| 6,718,161 B1 * | 4/2004 | Westall | H04B 7/2041 455/12.1 |
| 6,980,530 B2 * | 12/2005 | Reddy | H04B 7/2041 370/230 |
| 7,379,758 B2 | 5/2008 | Schiff et al. | |
| 7,444,150 B2 | 10/2008 | Rick et al. | |
| 8,723,724 B2 * | 5/2014 | Mendelsohn | H04B 7/18513 342/355 |
| 8,780,928 B2 * | 7/2014 | Natarajan | H04B 7/18584 370/400 |
| 8,983,470 B1 | 3/2015 | Ryan et al. | |
| 8,989,586 B2 * | 3/2015 | Arnold | H04B 7/185 398/125 |
| 8,995,998 B2 | 3/2015 | Singh et al. | |
| 9,277,468 B2 | 3/2016 | Nagaraja et al. | |
| 9,451,513 B2 | 9/2016 | Hole et al. | |
| 9,461,733 B2 * | 10/2016 | Tronc | H04B 7/18519 |
| 9,479,993 B2 * | 10/2016 | Benammar | H04W 36/30 |
| 9,608,716 B1 | 3/2017 | Elwailly et al. | |
| 9,647,748 B1 * | 5/2017 | Mitchell | H04B 7/18508 |
| 9,762,314 B2 * | 9/2017 | Ulupinar | H04B 7/18541 |
| 9,888,426 B2 * | 2/2018 | Ulupinar | H04B 7/2041 |
| 10,009,093 B2 * | 6/2018 | Purkayastha | H04B 7/18541 |
| 10,630,410 B2 * | 4/2020 | Parkvall | H04L 5/0053 |
| 2003/0027529 A1 * | 2/2003 | Haugli | H04L 1/0001 455/67.11 |
| 2003/0043071 A1 * | 3/2003 | Lilly | H01Q 3/2605 342/368 |
| 2005/0043046 A1 * | 2/2005 | Lee | H04W 36/0072 455/502 |
| 2005/0277443 A1 | 12/2005 | Ozluturk | |
| 2008/0263614 A1 * | 10/2008 | Xu | H04H 60/54 725/118 |
| 2009/0073042 A1 * | 3/2009 | De Win | G01S 19/28 342/450 |
| 2011/0169688 A1 * | 7/2011 | Wyler | H04B 7/2041 342/354 |
| 2012/0108270 A1 * | 5/2012 | Kazmi | H04W 36/0061 455/456.5 |
| 2015/0222294 A1 | 8/2015 | Eroz et al. | |
| 2015/0237569 A1 | 8/2015 | Jalali | |
| 2016/0105233 A1 | 4/2016 | Jalali | |
| 2016/0170029 A1 * | 6/2016 | Wyler | H01Q 3/26 342/354 |
| 2017/0331577 A1 * | 11/2017 | Parkvall | H04B 7/0848 |
| 2018/0054744 A1 * | 2/2018 | Smith | H04B 7/0695 |
| 2018/0063692 A1 * | 3/2018 | Ramachandra | H04W 48/16 |
| 2019/0041526 A1 * | 2/2019 | Lucky | G01S 19/05 |
| 2019/0075496 A1 * | 3/2019 | Huang | H04B 7/0473 |
| 2019/0222303 A1 * | 7/2019 | Lucky | H04B 7/18582 |

FOREIGN PATENT DOCUMENTS

| | | |
|---|---|---|
| CN | 101557608 A | 10/2009 |
| CN | 102340822 A | 2/2012 |
| CN | 102571166 A | 7/2012 |
| EP | 0774843 A2 | 5/1997 |
| JP | H0923466 A | 1/1997 |
| JP | H09214414 A | 8/1997 |
| JP | H11234726 A | 8/1999 |
| WO | 9610872 A1 | 4/1996 |
| WO | WO-9918690 A1 | 4/1999 |
| WO | 9956408 A1 | 11/1999 |
| WO | WO-2000005826 | 2/2000 |
| WO | WO-03026189 A1 | 3/2003 |
| WO | WO-2004002016 | 12/2003 |
| WO | WO-2004010609 | 1/2004 |
| WO | WO-2005039230 | 4/2005 |
| WO | 2009051592 A1 | 4/2009 |
| WO | WO-2010054338 | 5/2010 |

OTHER PUBLICATIONS

International Search Report and Written Opinion—PCT/US2017/049928—ISA/EPO—dated Mar. 6, 2018.

Partial International Search Report—PCT/US2017/049928—ISA/EPO—dated Nov. 22, 2017.

ETSI: "Satellite Component of UMTS (S-UMTS), Family SL Satellite Radio Interface, Part 3: Control Plane and User Plane Specifications, Sub-Part 1, Bearer Control Interface", ETSI Draft, TS102744-3-1_V002, V0.0.2 (Oct. 2009), European Telecommunications Standards Institute (ETSI), 650, Route Des Lucioles, F-06921 Sophia-Antipolis, France, No. V0.0.2, May 7, 2010 (May 7, 2010), pp. 1-114, XP014052547, [retrieved on May 7, 2010] paragraph [5.4.11.1]—paragraph [5.4.11.3.7].

* cited by examiner

NEIGHBOR CELL LIST

CROSS-REFERENCE TO RELATED APPLICATION(S)

This application is the U.S. national stage of PCT patent application number PCT/US17/49928 filed on Sep. 1, 2017, which claims priority to and the benefit of patent application number 201641031251 filed in the India Patent Office on Sep. 13, 2016 and patent application number 201644039659 filed in the India Patent Office on Nov. 21, 2016, the content of each of which is incorporated herein by reference.

INTRODUCTION

Various aspects described herein relate to wireless communication and, more particularly but not exclusively, to a neighbor cell list (NCL) that includes beam information and other information about nearby cells.

Conventional satellite-based communication systems include gateways and one or more satellites to relay communication signals between the gateways and one or more user terminals (UTs). A gateway is an earth station having an antenna for transmitting signals to, and receiving signals from, communication satellites. A gateway provides communication links, using satellites, for connecting a UT to other UTs or users of other communication systems, such as a public switched telephone network, the Internet and various public and/or private networks. A satellite is an orbiting receiver and repeater used to relay information.

A satellite can receive signals from and transmit signals to a UT provided the UT is within the "footprint" of the satellite. The footprint of a satellite is the geographic region on the surface of the earth within the range of signals of the satellite. The footprint is usually geographically divided into "beams," through the use of antennas (e.g., the antennas may be used to create fixed, static beams or may be used to create dynamically adjustable beams through beam-forming techniques). A cell may constitute any forward link frequency within a beam. In the case where each beam uses only one frequency, "cell" and "beam" are interchangeable. Each beam covers a particular geographic region within the footprint. Beams may be directed so that more than one beam from the same satellite covers the same specific geographic region. In addition, beams from multiple satellites may be directed to cover the same geographic region.

Geosynchronous satellites have long been used for communication. A geosynchronous satellite is stationary relative to a given location on the earth. However, because geosynchronous satellites are limited to a geosynchronous orbit (GSO), which is a circle having a radius of approximately 42,164 km from the center of the earth directly above the earth's equator, the number of satellites that may be placed in the GSO is limited.

As alternatives to geosynchronous satellites, communication systems which utilize a constellation of satellites in non-geosynchronous orbits, such as low-earth orbits (LEO), have been devised to provide communication coverage to the entire earth or at least large parts of the earth. In non-geosynchronous satellite-based systems, such as LEO satellite-based systems, the satellites move relative to a communication device (such as a gateway or a UT) on the ground. Since the satellites are moving, there is a need for techniques that enable a UT to obtain information about which satellites can provide service for the UT.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In one aspect, the disclosure provides an apparatus configured for communication that includes a memory and a processor coupled to the memory. The processor and the memory are configured to: determine a neighbor cell list that includes a start angle and span for at least one satellite; and send the neighbor cell list to an apparatus. In some aspects, the angle may be measured in elevation or azimuth.

Another aspect of the disclosure provides a method for communication including: determining a neighbor cell list that includes a start angle and span for at least one satellite; and sending the neighbor cell list to an apparatus. In some aspects, the angle may be measured in elevation or azimuth.

Another aspect of the disclosure provides an apparatus configured for communication. The apparatus including: means for determining a neighbor cell list that includes a start angle and span for at least one satellite; and means for sending the neighbor cell list to an apparatus. In some aspects, the angle may be measured in elevation or azimuth.

Another aspect of the disclosure provides a non-transitory computer-readable medium storing computer-executable code, including code to: determine a neighbor cell list that includes a start angle and span for at least one satellite; and send the neighbor cell list to an apparatus. In some aspects, the angle may be measured in elevation or azimuth.

In one aspect, the disclosure provides an apparatus configured for communication that includes a memory and a processor coupled to the memory. The processor and the memory are configured to: receive a neighbor cell list that includes a start angle and span for at least one satellite; and identify a target beam based on the neighbor cell list. In some aspects, the angle may be measured in elevation or azimuth.

Another aspect of the disclosure provides a method for communication including: receiving a neighbor cell list that includes a start angle and span for at least one satellite; and identifying a target beam based on the neighbor cell list. In some aspects, the angle may be measured in elevation or azimuth.

Another aspect of the disclosure provides an apparatus configured for communication. The apparatus including: means for receiving a neighbor cell list that includes a start angle and span for at least one satellite; and means for identifying a target beam based on the neighbor cell list. In some aspects, the angle may be measured in elevation or azimuth.

Another aspect of the disclosure provides a non-transitory computer-readable medium storing computer-executable code, including code to: receive a neighbor cell list that includes a start angle and span for at least one satellite; and identify a target beam based on the neighbor cell list. In some aspects, the angle may be measured in elevation or azimuth.

In one aspect, the disclosure provides an apparatus configured for communication that includes a memory and a processor coupled to the memory. The processor and the memory are configured to: determine a neighbor cell list that includes beam pointing information for at least one satellite; and send the neighbor cell list to an apparatus.

Another aspect of the disclosure provides a method for communication including: determining a neighbor cell list that includes beam pointing information for at least one satellite; and sending the neighbor cell list to an apparatus.

Another aspect of the disclosure provides an apparatus configured for communication. The apparatus including: means for determining a neighbor cell list that includes beam pointing information for at least one satellite; and means for sending the neighbor cell list to an apparatus.

Another aspect of the disclosure provides a non-transitory computer-readable medium storing computer-executable code, including code to: determine a neighbor cell list that includes beam pointing information for at least one satellite; and send the neighbor cell list to an apparatus.

In one aspect, the disclosure provides an apparatus configured for communication that includes a memory and a processor coupled to the memory. The processor and the memory are configured to: receive a neighbor cell list that includes beam pointing information for at least one satellite; and identify a target beam based on the neighbor cell list.

Another aspect of the disclosure provides a method for communication including: receiving a neighbor cell list that includes beam pointing information for at least one satellite; and identifying a target beam based on the neighbor cell list.

Another aspect of the disclosure provides an apparatus configured for communication. The apparatus including: means for receiving a neighbor cell list that includes beam pointing information for at least one satellite; and means for identifying a target beam based on the neighbor cell list.

Another aspect of the disclosure provides a non-transitory computer-readable medium storing computer-executable code, including code to: receive a neighbor cell list that includes beam pointing information for at least one satellite; and identify a target beam based on the neighbor cell list.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

BRIEF DESCRIPTION OF THE DRAWINGS

The accompanying drawings are presented to aid in the description of aspects of the disclosure and are provided solely for illustration of the aspects and not limitations thereof.

DETAILED DESCRIPTION

Various aspects of the disclosure relate to a neighbor cell list and to enabling a user terminal (UT) to obtain information about nearby cells. In a first example, a neighbor cell list can be sent to a UT or UTs, where the neighbor cell list identifies the cells in the neighborhood or vicinity of a UT and provides information about any beams associated with those cells. The criteria defining the neighborhood or vicinity of a UT may include (but are not limited to) cell velocity, cell direction of motion, cell on/off schedules, cell/beam pointing angles, satellite location, satellite attitude (pitch, roll, yaw), UT-to-cell distance, UT velocity and direction of motion. Thus, a UT can learn the neighboring beams/cells that the UT can reselect to if the current beam/cell becomes weak. The UT can then use this information to determine which cell of the satellite the UT should look for and which beam of the satellite the UT should point to. For example, the UT can use this information to identify a target beam for re-selection. In a second example, the neighbor cell list can include a start angle and a span for one or more satellites. In this case, a UT can identify a target beam for re-selection based on the start angle and span information.

Aspects of the disclosure are described in the following description and related drawings directed to specific examples. Alternate examples may be devised without departing from the scope of the disclosure. Additionally, well-known elements will not be described in detail or will be omitted so as not to obscure the relevant details of the disclosure.

Figure 1:
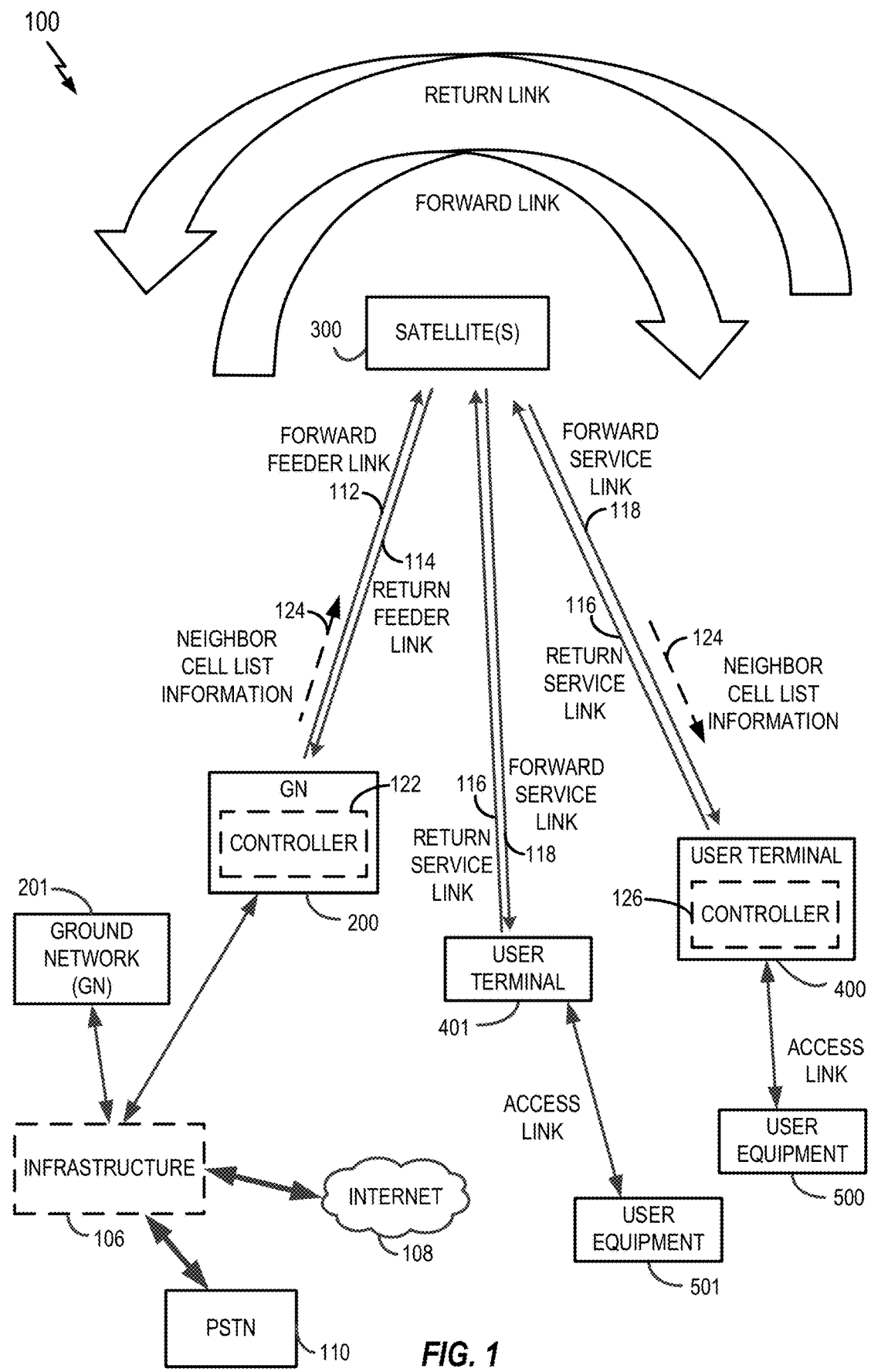
FIG. 1 is a block diagram of an example communication system in accordance with some aspects of the disclosure.

FIG. 1 illustrates an example of a satellite communication system 100 which includes a plurality of satellites (although only one satellite 300 is shown for clarity of illustration) in non-geosynchronous orbits, for example, low-earth orbits (LEO), a ground network 200 (e.g., corresponding to a satellite gateway or a satellite network portal) in communication with the satellite 300, a plurality of UTs 400 and 401 in communication with the satellite 300, and a plurality of user equipment (UE) 500 and 501 in communication with the UTs 400 and 401, respectively. Each UE 500 or 501 may be a user device such as a mobile device, a telephone, a smartphone, a tablet, a laptop computer, a computer, a wearable device, a smart watch, an audiovisual device, or any device including the capability to communicate with a UT. Additionally, the UE 500 and/or the UE 501 may be a device (e.g., access point, small cell, etc.) that is used to communicate to one or more end user devices. In the example illustrated in FIG. 1, the UT 400 and the UE 500 communicate with each other via a bidirectional access link (having a forward access link and a return access link), and similarly, the UT 401 and the UE 501 communicate with each other via another bidirectional access link. In another implementation, one or more additional UEs (not shown) may be configured to receive only and therefore communicate with a UT only using a forward access link. In another implementation, one or more additional UEs (not shown) may also communicate with the UT 400 or the UT 401. Alternatively, a UT and a corresponding UE may be integral parts of a single physical device, such as a mobile telephone with an integral satellite transceiver and an antenna for communicating directly with a satellite, for example.

The GN 200 may have access to the Internet 108 or one or more other types of public, semiprivate or private networks. In the example illustrated in FIG. 1, the GN 200 is in communication with infrastructure 106, which is capable of accessing the Internet 108 or one or more other types of public, semiprivate or private networks. The GN 200 may also be coupled to various types of communication backhaul, including, for example, landline networks such as optical fiber networks or public switched telephone networks (PSTN) 110. Further, in alternative implementations the GN 200 may interface to the Internet 108, PSTN 110, or one or more other types of public, semiprivate or private networks without using the infrastructure 106. Still further, the GN 200 may communicate with other GNs, such as the GN 201 through the infrastructure 106 or alternatively may be configured to communicate to the GN 201 without using the infrastructure 106. The infrastructure 106 may include, in whole or part, a network control center (NCC), a satellite control center (SCC), a wired and/or wireless core network and/or any other components or systems used to facilitate operation of and/or communication with the satellite communication system 100.

Communication between the satellite 300 and the GN 200 in both directions are called feeder links, whereas communication between the satellite and each of the UTs 400 and 401 in both directions are called service links. A signal path from the satellite 300 to a ground station, which may be the GN 200 or one of the UTs 400 and 401, may be generically called a downlink. A signal path from a ground station to the satellite 300 may be generically called an uplink. Additionally, as illustrated, signals can have a general directionality such as a forward link and a return link (or reverse link). Accordingly, a communication link in a direction originating from the GN 200 and terminating at the UT 400 through the satellite 300 is called a forward link, whereas a communication link in a direction originating from the UT 400 and terminating at the GN 200 through the satellite 300 is called a return link or a reverse link. As such, the signal path from the GN 200 to the satellite 300 is labeled a "Forward Feeder Link" 112 whereas the signal path from the satellite 300 to the GN 200 is labeled a "Return Feeder Link" 114 in FIG. 1. In a similar manner, the signal path from each UT 400 or 401 to the satellite 300 is labeled a "Return Service Link" 116 whereas the signal path from the satellite 300 to each UT 400 or 401 is labeled a "Forward Service Link" 118 in FIG. 1.

In accordance with the teachings herein, the satellite communication system 100 manages neighbor cell list (NCL) information. In some implementations, the GN 200 includes a controller 122 that communicates NCL information and/or determines NCL information. In some implementations, the controller 122 receives NCL information and forwards the NCL information to the UTs. In some implementations, the controller 122 generates NCL information and forwards the NCL information 124 to the UTs. In some implementations, the UT 400 includes a controller 126 that receives and manages a local copy of NCL information. Other components of the satellite communication system 100 may include corresponding controllers as well. For example, other GNs, satellites, and UTs (not shown) may include a corresponding controller.

Figure 2:
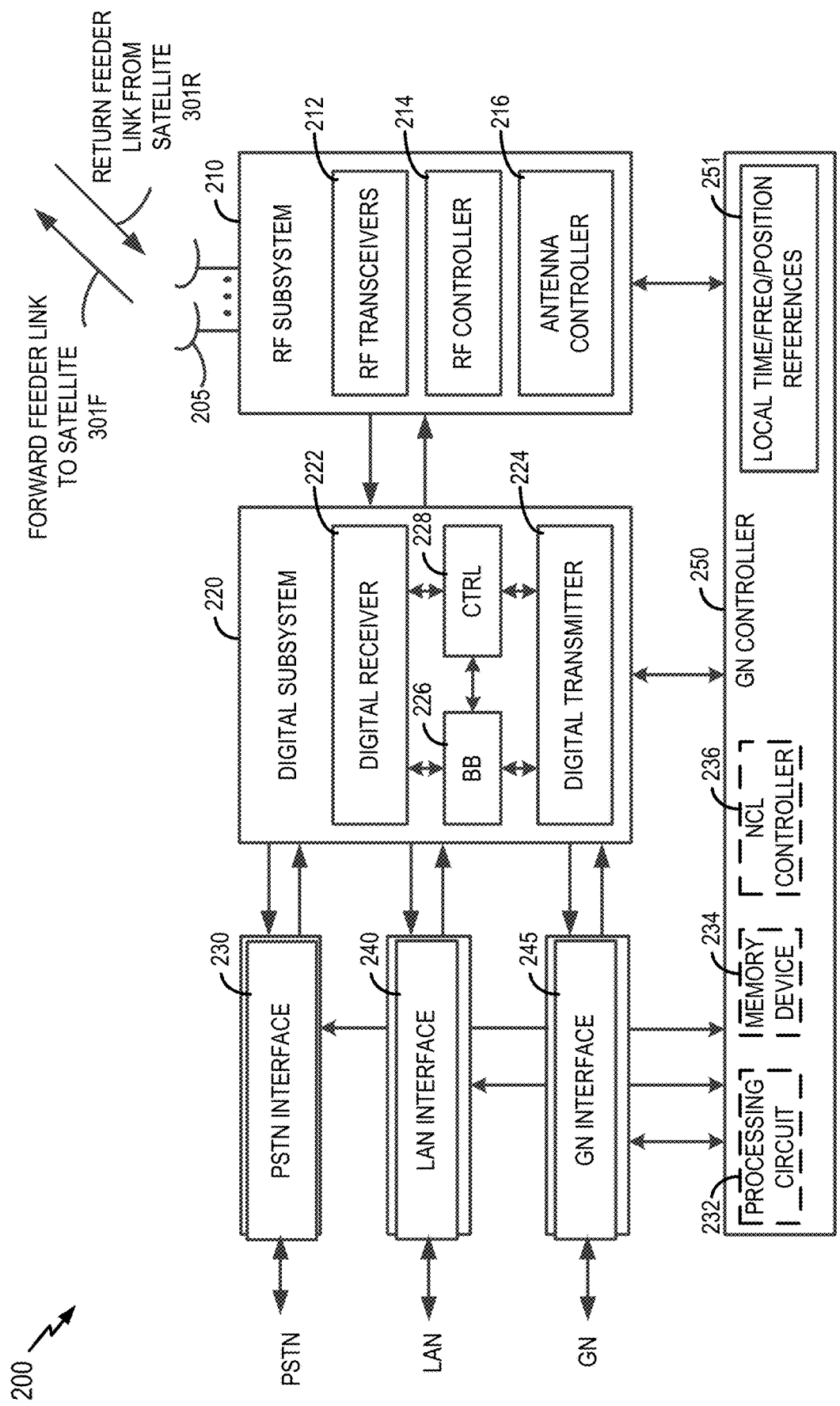
FIG. 2 is a block diagram of one example of a ground network (GN) of FIG. 1 in accordance with some aspects of the disclosure.

FIG. 2 is an example block diagram of the GN 200, which also can apply to the GN 201 of FIG. 1. The GN 200 is shown to include a number of antennas 205, an RF subsystem 210, a digital subsystem 220, a Public Switched Telephone Network (PSTN) interface 230, a Local Area Network (LAN) interface 240, a GN interface 245, and a GN controller 250. The RF subsystem 210 is coupled to the antennas 205 and to the digital subsystem 220. The digital subsystem 220 is coupled to the PSTN interface 230, to the LAN interface 240, and to the GN interface 245. The GN controller 250 is coupled to the RF subsystem 210, the digital subsystem 220, the PSTN interface 230, the LAN interface 240, and the GN interface 245.

The RF subsystem 210, which may include a number of RF transceivers 212, an RF controller 214, and an antenna controller 216, may transmit communication signals to the satellite 300 via a forward feeder link 301F, and may receive communication signals from the satellite 300 via a return feeder link 301R. Although not shown for simplicity, each of the RF transceivers 212 may include a transmit chain and a receive chain. Each receive chain may include a low noise amplifier (LNA) and a down-converter (e.g., a mixer) to amplify and down-convert, respectively, received communication signals in a well-known manner. In addition, each receive chain may include an analog-to-digital converter (ADC) to convert the received communication signals from analog signals to digital signals (e.g., for processing by the digital subsystem 220). Each transmit chain may include an up-converter (e.g., a mixer) and a power amplifier (PA) to up-convert and amplify, respectively, communication signals to be transmitted to the satellite 300 in a well-known manner. In addition, each transmit chain may include a digital-to-analog converter (DAC) to convert the digital signals received from the digital subsystem 220 to analog signals to be transmitted to the satellite 300.

The RF controller 214 may be used to control various aspects of a number of RF transceivers 212 (e.g., selection of the carrier frequency, frequency and phase calibration, gain settings, and the like). The antenna controller 216 may control various aspects of the antennas 205 (e.g., beamforming, beam steering, gain settings, frequency tuning, and the like).

The digital subsystem 220 may include a number of digital receiver modules 222, a number of digital transmitter modules 224, a baseband (BB) processor 226, and a control (CTRL) processor 228. The digital subsystem 220 may process communication signals received from the RF subsystem 210 and forward the processed communication signals to the PSTN interface 230 and/or the LAN interface 240, and may process communication signals received from the PSTN interface 230 and/or the LAN interface 240 and forward the processed communication signals to the RF subsystem 210.

Each digital receiver module 222 may correspond to signal processing elements used to manage communication between the GN 200 and the UT 400. One of the receive chains of RF transceivers 212 may provide input signals to multiple digital receiver modules 222. A number of digital receiver modules 222 may be used to accommodate all of the satellite beams and possible diversity mode signals being handled at any given time. Although not shown for simplicity, each digital receiver module 222 may include one or more digital data receivers, a searcher receiver, and a diversity combiner and decoder circuit. The searcher receiver may be used to search for appropriate diversity modes of carrier signals, and may be used to search for pilot signals (or other relatively fixed pattern strong signals).

The digital transmitter modules 224 may process signals to be transmitted to the UT 400 via the satellite 300. Although not shown for simplicity, each digital transmitter module 224 may include a transmit modulator that modulates data for transmission. The transmission power of each transmit modulator may be controlled by a corresponding digital transmit power controller (not shown for simplicity) that may (1) apply a minimum level of power for purposes of interference reduction and resource allocation and (2) apply appropriate levels of power when needed to compensate for attenuation in the transmission path and other path transfer characteristics.

The control processor 228, which is coupled to the digital receiver modules 222, the digital transmitter modules 224, and the baseband processor 226, may provide command and control signals to effect functions such as, but not limited to, signal processing, timing signal generation, power control, handoff control, diversity combining, and system interfacing.

The control processor 228 may also control the generation and power of pilot, synchronization, and paging channel signals and their coupling to the transmit power controller (not shown for simplicity). The pilot channel is a signal that is not modulated by data, and may use a repetitive unchanging pattern or non-varying frame structure type (pattern) or tone type input. For example, the orthogonal function used to form the channel for the pilot signal generally has a constant value, such as all 1's or 0's, or a well-known repetitive pattern, such as a structured pattern of interspersed 1's and 0's.

The baseband processor 226 is well known in the art and is therefore not described in detail herein. For example, the baseband processor 226 may include a variety of known elements such as (but not limited to) coders, data modems, and digital data switching and storage components.

The PSTN interface 230 may provide communication signals to, and receive communication signals from, an external PSTN either directly or through additional infrastructure 106, as illustrated in FIG. 1. The PSTN interface 230 is well known in the art, and therefore is not described in detail herein. For other implementations, the PSTN interface 230 may be omitted, or may be replaced with any other suitable interface that connects the GN 200 to a ground-based network (e.g., the Internet).

The LAN interface 240 may provide communication signals to, and receive communication signals from, an external LAN. For example, the LAN interface 240 may be coupled to the Internet 108 either directly or through additional infrastructure 106, as illustrated in FIG. 1. The LAN interface 240 is well known in the art, and therefore is not described in detail herein.

The GN interface 245 may provide communication signals to, and receive communication signals from, one or more other GNs associated with the satellite communication system 100 of FIG. 1 (and/or to/from GNs associated with other satellite communication systems, not shown for simplicity). For some implementations, the GN interface 245 may communicate with other GNs via one or more dedicated communication lines or channels (not shown for simplicity). For other implementations, the GN interface 245 may communicate with other GNs using the PSTN 110 and/or other networks such as the Internet 108 (see also FIG. 1). For at least one implementation, the GN interface 245 may communicate with other GNs via the infrastructure 106.

Overall GN control may be provided by the GN controller 250. The GN controller 250 may plan and control utilization of the satellite 300's resources by the GN 200. For example, the GN controller 250 may analyze trends, generate traffic plans, allocate satellite resources, monitor (or track) satellite positions, and monitor the performance of the GN 200 and/or the satellite 300. The GN controller 250 may also be coupled to a ground-based satellite controller (not shown for simplicity) that maintains and monitors orbits of the satellite 300, relays satellite usage information to the GN 200, tracks the positions of the satellite 300, and/or adjusts various channel settings of the satellite 300.

For the example implementation illustrated in FIG. 2, the GN controller 250 includes local time, frequency, and position references 251, which may provide local time or frequency information to the RF subsystem 210, the digital subsystem 220, and/or the interfaces 230, 240, and 245. The time or frequency information may be used to synchronize the various components of the GN 200 with each other and/or with the satellite(s) 300. The local time, frequency, and position references 251 may also provide position information (e.g., ephemeris data) of the satellite(s) 300 to the various components of the GN 200. Further, although depicted in FIG. 2 as included within the GN controller 250, for other implementations, the local time, frequency, and the position references 251 may be a separate subsystem that is coupled to the GN controller 250 (and/or to one or more of the digital subsystem 220 and the RF subsystem 210).

Although not shown in FIG. 2 for simplicity, the GN controller 250 may also be coupled to a network control center (NCC) and/or a satellite control center (SCC). For example, the GN controller 250 may allow the SCC to communicate directly with the satellite(s) 300, for example, to retrieve ephemeris data from the satellite(s) 300. The GN controller 250 may also receive processed information (e.g., from the SCC and/or the NCC) that allows the GN controller 250 to properly aim its antennas 205 (e.g., at the appropriate satellite(s) 300), to schedule beam transmissions, to coordinate handoffs, and to perform various other well-known functions.

The GN controller 250 may include one or more of a processing circuit 232, a memory device 234, or an NCL controller 236 that independently or cooperatively perform NCL information-related operations for the GN 200 as taught herein. In an example implementation, the processing circuit 232 is configured (e.g., programmed) to perform some or all of these operations. In another example implementation, the processing circuit 232 (e.g., in the form of a processor) executes code stored in the memory device 234 to perform some or all of these operations. In another example implementation, the NCL controller 236 is configured (e.g., programmed) to perform some or all of these operations. Although depicted in FIG. 2 as included within the GN controller 250, for other implementations, one or more of the processing circuit 232, the memory device 234, or the NCL controller 236 may be a separate subsystem that is coupled to the GN controller 250 (and/or to one or more of the digital subsystem 220 and the RF subsystem 210).

Figure 3:
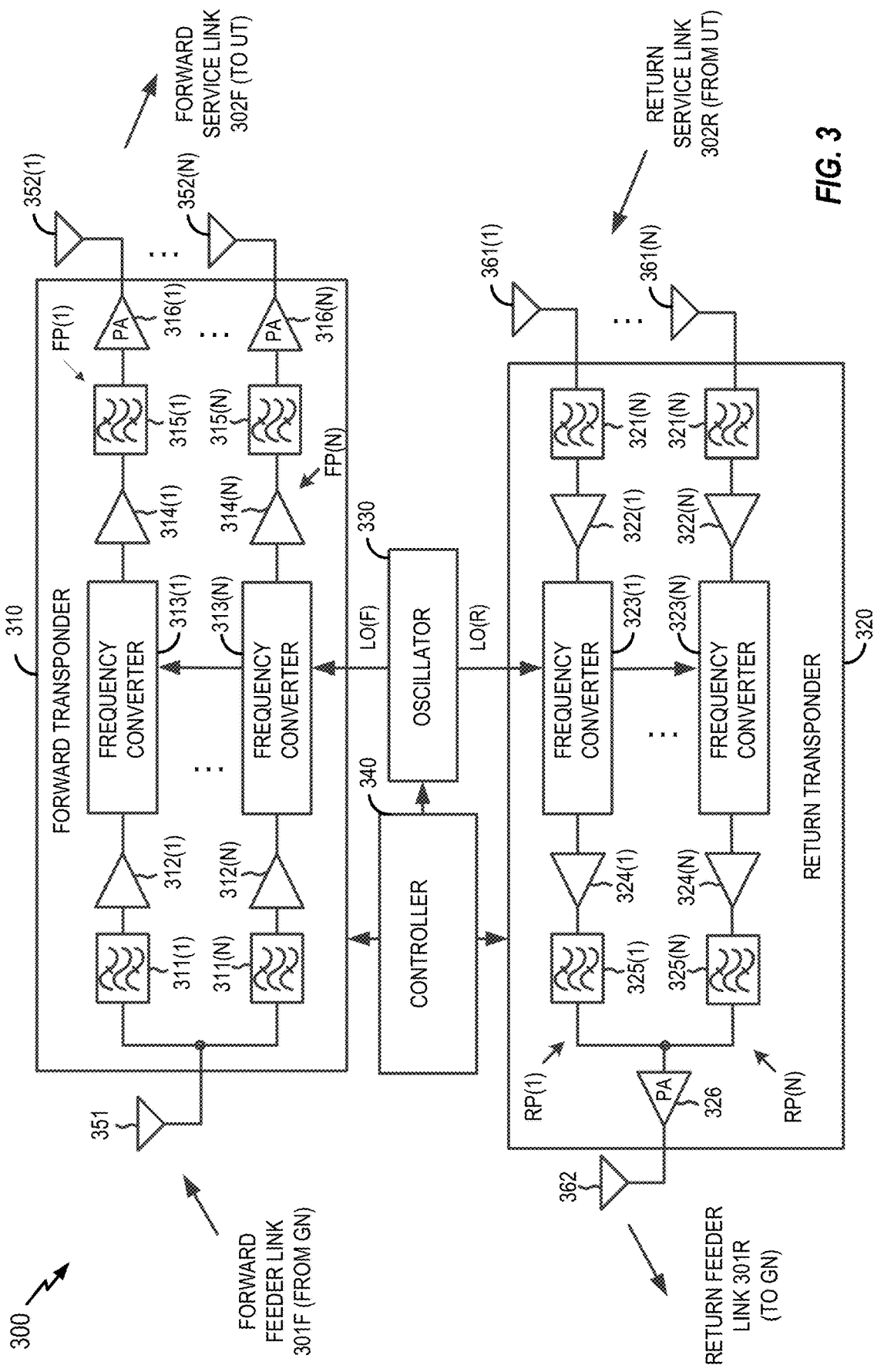
FIG. 3 is a block diagram of one example of a satellite of FIG. 1 in accordance with some aspects of the disclosure.

FIG. 3 is an example block diagram of the satellite 300 for illustrative purposes only. It will be appreciated that specific satellite configurations can vary significantly and may or may not include on-board processing. Further, although illustrated as a single satellite, two or more satellites using inter-satellite communication may provide the functional connection between the GN 200 and the UT 400. It will be appreciated that the disclosure is not limited to any specific satellite configuration and any satellite or combinations of satellites that can provide the functional connection between the GN 200 and UT 400 can be considered within the scope of the disclosure. In one example, the satellite 300 is shown to include a forward transponder 310, a return transponder 320, an oscillator 330, a controller 340, forward link antennas 351 and 352(1)-352(N), and return link antennas 362 and 361(1)-361(N). The forward transponder 310, which may process communication signals within a corresponding channel or frequency band, may include a respective one of first bandpass filters 311(1)-311(N), a respective one of first low noise amplifiers (LNAs) 312(1)-312(N), a respective one of frequency converters 313(1)-313(N), a respective one of second LNAs 314(1)-314(N), a respective one of second bandpass filters 315(1)-315(N), and a respective one of power amplifiers (PAs) 316(1)-316(N). Each of the PAs 316(1)-316(N) is coupled to a respective one of antennas 352(1)-352(N), as shown in FIG. 3.

Within each of respective forward paths FP(1)-FP(N), the first bandpass filter 311 passes signal components having frequencies within the channel or frequency band of the respective forward path FP, and filters signal components having frequencies outside the channel or frequency band of the respective forward path FP. Thus, the pass band of the first bandpass filter 311 corresponds to the width of the channel associated with the respective forward path FP. The first LNA 312 amplifies the received communication signals to a level suitable for processing by the frequency converter 313. The frequency converter 313 converts the frequency of the communication signals in the respective forward path FP (e.g., to a frequency suitable for transmission from the satellite 300 to the UT 400). The second LNA 314 amplifies the frequency-converted communication signals, and the second bandpass filter 315 filters signal components having frequencies outside of the associated channel width. The PA 316 amplifies the filtered signals to a power level suitable for transmission to the UTs 400 via a respective antenna 352.

The return transponder 320, which includes a number N of return paths RP(1)-RP(N), receives communication signals from the UT 400 along the return service link 302R via the antennas 361(1)-361(N), and transmits communication signals to the GN 200 along the return feeder link 301R via one or more of the antennas 362. Each of the return paths RP(1)-RP(N), which may process communication signals within a corresponding channel or frequency band, may be coupled to a respective one of the antennas 361(1)-361(N), and may include a respective one of first bandpass filters 321(1)-321(N), a respective one of first LNAs 322(1)-322(N), a respective one of frequency converters 323(1)-323(N), a respective one of second LNAs 324(1)-324(N), and a respective one of second bandpass filters 325(1)-325(N).

Within each of the respective return paths RP(1)-RP(N), the first bandpass filter 321 passes signal components having frequencies within the channel or frequency band of the respective return path RP, and filters signal components having frequencies outside the channel or frequency band of the respective return path RP. Thus, the pass band of the first bandpass filter 321 may for some implementations correspond to the width of the channel associated with the respective return path RP. The first LNA 322 amplifies all the received communication signals to a level suitable for processing by the frequency converter 323. The frequency converter 323 converts the frequency of the communication signals in the respective return path RP (e.g., to a frequency suitable for transmission from the satellite 300 to the GN 200). The second LNA 324 amplifies the frequency-converted communication signals, and the second bandpass filter 325 filters signal components having frequencies outside of the associated channel width. Signals from the return paths RP(1)-RP(N) are combined and provided to the one or more antennas 362 via a PA 326. The PA 326 amplifies the combined signals for transmission to the GN 200.

The oscillator 330, which may be any suitable circuit or device that generates an oscillating signal, provides a forward local oscillator signal LO(F) to the frequency converters 313(1)-313(N) of the forward transponder 310, and provides a return local oscillator signal LO(R) to the frequency converters 323(1)-323(N) of the return transponder 320. For example, the LO(F) signal may be used by the frequency converters 313(1)-313(N) to convert communication signals from a frequency band associated with the transmission of signals from the GN 200 to the satellite 300 to a frequency band associated with the transmission of signals from the satellite 300 to the UT 400. The LO(R) signal may be used by the frequency converters 323(1)-323(N) to convert communication signals from a frequency band associated with the transmission of signals from the UT 400 to the satellite 300 to a frequency band associated with the transmission of signals from the satellite 300 to the GN 200.

The controller 340, which is coupled to the forward transponder 310, the return transponder 320, and the oscillator 330, may control various operations of the satellite 300 including (but not limited to) channel allocations. In one aspect, the controller 340 may include a processing circuit 364 (e.g., a processor) coupled to a memory (e.g., a memory device 366). The memory may include a non-transitory computer-readable medium (e.g., one or more nonvolatile memory elements, such as an EPROM, an EEPROM, a Flash memory, a hard drive, etc.) storing instructions that, when executed by the processing circuit 364, cause the satellite 300 to perform operations including (but not limited to) those described herein.

Figure 4:
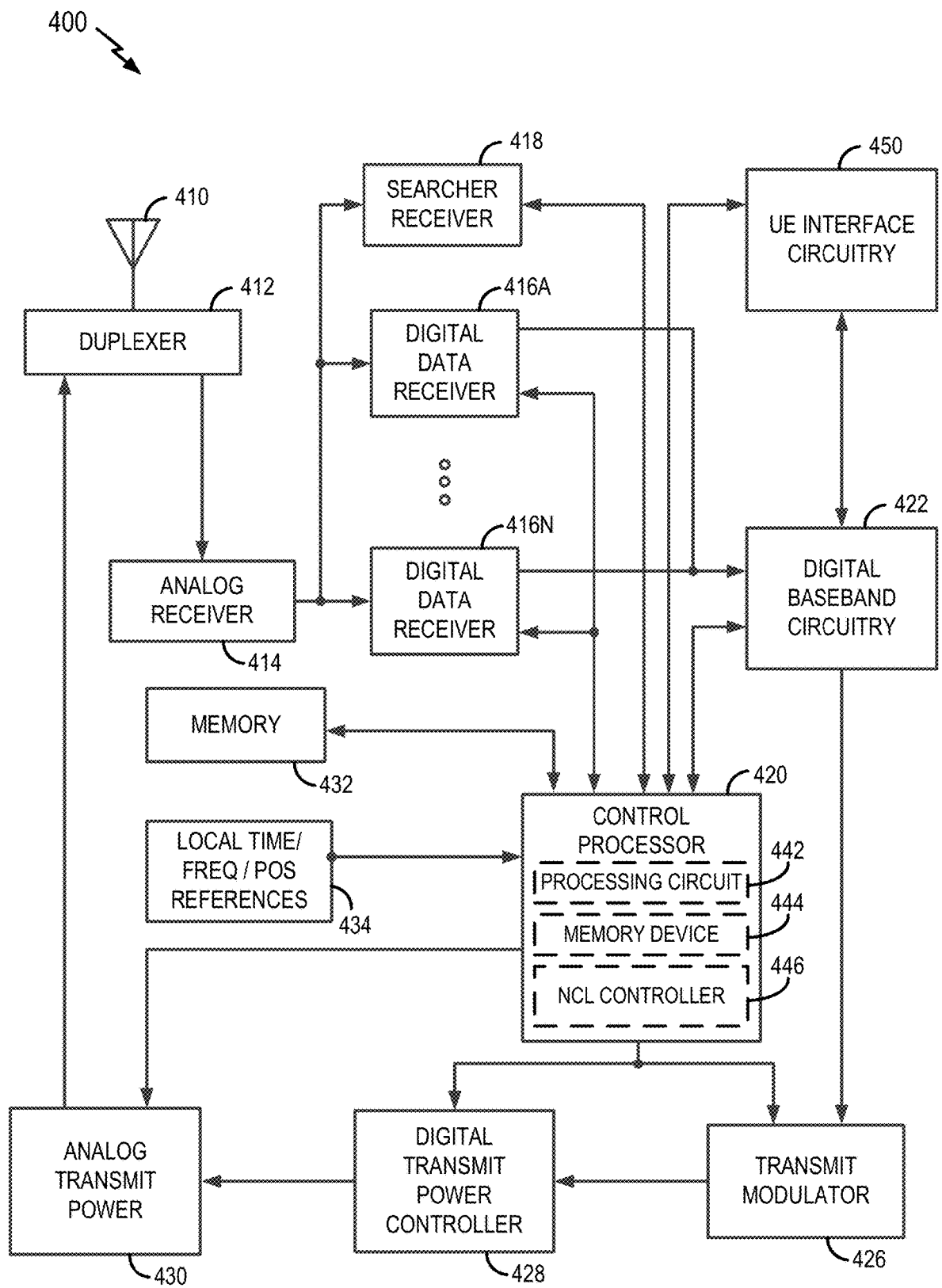
FIG. 4 is a block diagram of one example of a UT of FIG. 1 in accordance with some aspects of the disclosure.

FIG. 4 is an example block diagram of the UT 400 or the UT 401 for illustrative purposes only. It will be appreciated that specific UT configurations can vary significantly. Thus, the disclosure is not limited to any specific UT configuration and any UT that can provide the functional connection between the satellite 300 and the UE 500 or 501 can be considered within the scope of the disclosure.

UTs may be used in various applications. In some scenarios, a UT may provide a cellular backhaul. In this case, the UT may have a relatively large antenna and/or multiple antennas (e.g., to protect against blockage). In some scenarios, a UT may be deployed in an enterprise environment (e.g., placed on the roof of a building). In this case, the UT may have a relatively large antenna and/or multiple antennas (e.g., to provide relatively high backhaul bandwidth). In some scenarios, a UT may be deployed in a residential environment (e.g., placed on the roof of a house). In this case, the UT may have a smaller (and relatively inexpensive) antenna and provide fixed access for data service (e.g., Internet access). In some scenarios, a UT may be deployed in a maritime environment (e.g., placed on a cruise ship, a cargo ship, etc.). In this case, the UT may have a relatively large antenna and/or multiple antennas (e.g., to prevent blockage and provide relatively high bandwidth data service). In some scenarios, a UT may be deployed on a vehicle (e.g., carried by first responders, emergency crews, etc.). In this case, the UT may have a smaller antenna and used to provide temporary Internet access to a particular area (e.g., where cellular service is out). Other scenarios are possible.

The configuration of a particular UT may depend on the application for which the UT will be used. For example, the type of antenna, the antenna shape, the quantity of antennas, the supported bandwidth, the supported transmit power, the receiver sensitivity, etc., may depend on the corresponding application. As one example, a flat panel antenna (with a relatively low profile) may be used for aircraft applications.

In the example of FIG. 4, the UT is shown to include a transceiver where at least one antenna 410 is provided for receiving forward link communication signals (e.g., from the satellite 300), which are transferred to an analog receiver 414, where they are down-converted, amplified, and digitized. A duplexer element 412 is often used to allow the same antenna to serve both transmit and receive functions. Alternatively, a UT transceiver may employ separate antennas for operating at different transmit and receive frequencies.

The digital communication signals output by the analog receiver 414 are transferred to at least one digital data receiver 416A and at least one searcher receiver 418. Additional digital data receivers (e.g., as represented by a digital data receiver 416N) can be used to obtain desired levels of signal diversity, depending on the acceptable level of transceiver complexity, as would be apparent to one skilled in the relevant art.

At least one user terminal control processor 420 is coupled to the digital data receivers 416A-416N and the searcher receiver 418. The control processor 420 provides, among other functions, basic signal processing, timing, power and handoff control or coordination, and selection of frequency used for signal carriers. Another basic control function that may be performed by the control processor 420 is the selection or manipulation of functions to be used for processing various signal waveforms. Signal processing by the control processor 420 can include a determination of relative signal strength and computation of various related signal parameters. Such computations of signal parameters, such as timing and frequency may include the use of additional or separate dedicated circuitry to provide increased efficiency or speed in measurements or improved allocation of control processing resources.

The outputs of the digital data receivers 416A-416N are coupled to digital baseband circuitry 422 within the UT 400. The digital baseband circuitry 422 includes processing and presentation elements used to transfer information to and from the UE 500 as shown in FIG. 1, for example. Referring to FIG. 4, if diversity signal processing is employed, the digital baseband circuitry 422 may include a diversity combiner and decoder (not shown). Some of these elements may also operate under the control of, or in communication with, a control processor 420.

When voice or other data is prepared as an output message or a communication signal originating with the UT 400, the digital baseband circuitry 422 is used to receive, store, process, and otherwise prepare the desired data for transmission. The digital baseband circuitry 422 provides this data to a transmit modulator 426 operating under the control of the control processor 420. The output of the transmit modulator 426 is transferred to a power controller 428 which provides output power control to a transmit power amplifier 430 for final transmission of the output signal from the antenna 410 to a satellite (e.g., the satellite 300).

In FIG. 4, the UT transceiver also includes a memory 432 associated with the control processor 420. The memory 432 may include instructions for execution by the control processor 420 as well as data for processing by the control processor 420. In the example illustrated in FIG. 4, the memory 432 may include instructions for performing time or frequency adjustments to be applied to an RF signal to be transmitted by the UT 400 via the return service link to the satellite 300.

In the example illustrated in FIG. 4, the UT 400 also includes optional local time, frequency and/or position references 434 (e.g., a GPS receiver), which may provide local time, frequency and/or position information to the control processor 420 for various applications, including, for example, time or frequency synchronization for the UT 400.

The digital data receivers 416A-416N and the searcher receiver 418 are configured with signal correlation elements to demodulate and track specific signals. The searcher receiver 418 is used to search for pilot signals, or other relatively fixed pattern strong signals, while the digital data receivers 416A-416N are used to demodulate other signals associated with detected pilot signals. However, a digital data receiver 416 can be assigned to track the pilot signal after acquisition to accurately determine the ratio of signal chip energies to signal noise, and to formulate pilot signal strength. Therefore, the outputs of these units can be monitored to determine the energy in, or frequency of, the pilot signal or other signals. These receivers also employ frequency tracking elements that can be monitored to provide current frequency and timing information to the control processor 420 for signals being demodulated.

The control processor 420 may use such information to determine to what extent the received signals are offset from the oscillator frequency, when scaled to the same frequency band, as appropriate. This and other information related to frequency errors and frequency shifts can be stored in a storage or memory element (e.g., the memory 432) as desired.

The control processor 420 may also be coupled to the UE interface circuitry 450 to allow communication between the UT 400 and one or more UEs. The UE interface circuitry 450 may be configured as desired for communication with various UE configurations and accordingly may include various transceivers and related components depending on the various communication technologies employed to communicate with the various UEs supported. For example, the UE interface circuitry 450 may include one or more antennas, a wide area network (WAN) transceiver, a wireless local area network (WLAN) transceiver, a Local Area Network (LAN) interface, a Public Switched Telephone Network (PSTN) interface and/or other known communication technologies configured to communicate with one or more UEs in communication with the UT 400.

The control processor 420 may include one or more of a processing circuit 442, a memory device 444, or an NCL controller 446 that independently or cooperatively perform NCL information-related operations for the UT 400 as taught herein. In an example implementation, the processing circuit 442 is configured (e.g., programmed) to perform some or all of these operations. In another example implementation, the processing circuit 442 (e.g., in the form of a processor) executes code stored in the memory device 444 to perform some or all of these operations. In another example implementation, the NCL controller 446 is configured (e.g., programmed) to perform some or all of these operations. Although depicted in FIG. 4 as included within the control processor 420, for other implementations, one or more of the processing circuit 442, the memory device 444, or the NCL controller 446 may be a separate subsystem that is coupled to the control processor 420.

Figure 5:
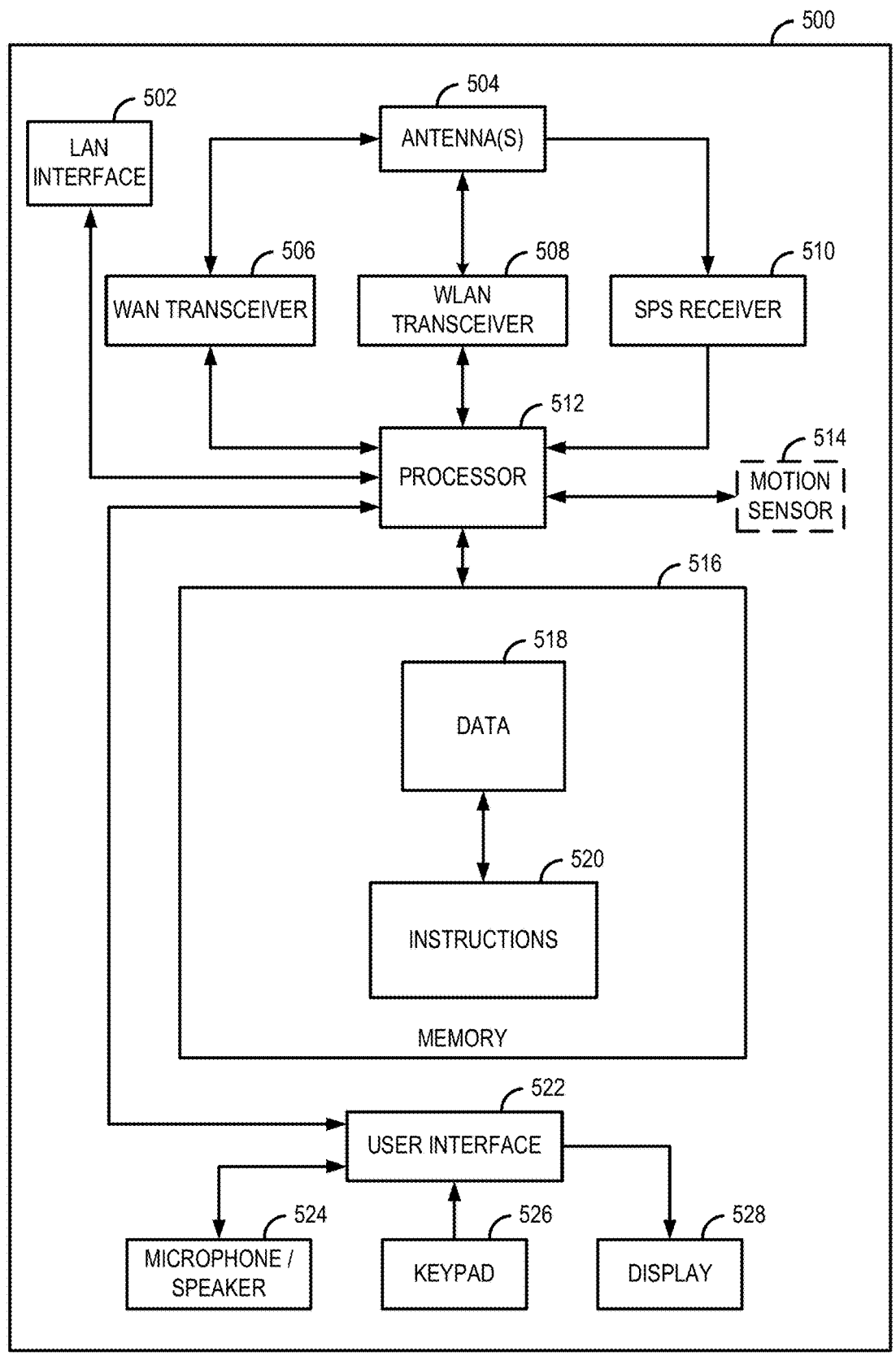
FIG. 5 is a block diagram of one example of a user equipment of FIG. 1 in accordance with some aspects of the disclosure.

FIG. 5 is a block diagram illustrating an example of the UE 500, which also can apply to the UE 501 of FIG. 1. The UE 500 as shown in FIG. 5 may be a mobile device, a handheld computer, a tablet, a wearable device, a smart watch, or any type of device capable of interacting with a user, for example. Additionally, the UE 500 may be a network side device that provides connectivity to various ultimate end user devices and/or to various public or private networks. In the example shown in FIG. 5, the UE 500 may include a LAN interface 502, one or more antennas 504, a wide area network (WAN) transceiver 506, a wireless local area network (WLAN) transceiver 508, and a satellite positioning system (SPS) receiver 510. The SPS receiver 510 may be compatible with the Global Positioning System (GPS), the Global Navigation Satellite System (GLONASS) and/or any other global or regional satellite based positioning system. In an alternate aspect, the UE 500 may include a WLAN transceiver 508, such as a Wi-Fi transceiver, with or without the LAN interface 502, the WAN transceiver 506, and/or the SPS receiver 510, for example. Further, the UE 500 may include additional transceivers such as Bluetooth, ZigBee and other known technologies, with or without the LAN interface 502, the WAN transceiver 506, the WLAN transceiver 508 and/or the SPS receiver 510. Accordingly, the elements illustrated for the UE 500 are provided merely as an example configuration and are not intended to limit the configuration of UEs in accordance with the various aspects disclosed herein.

In the example shown in FIG. 5, a processor 512 is connected to the LAN interface 502, the WAN transceiver 506, the WLAN transceiver 508 and the SPS receiver 510. Optionally, a motion sensor 514 and other sensors may also be coupled to the processor 512.

A memory 516 is connected to the processor 512. In one aspect, the memory 516 may include data 518 which may be transmitted to and/or received from the UT 400, as shown in FIG. 1. Referring to FIG. 5, the memory 516 may also include stored instructions 520 to be executed by the processor 512 to perform the process steps for communicating with the UT 400, for example. Furthermore, the UE 500 may also include a user interface 522, which may include hardware and software for interfacing inputs or outputs of the processor 512 with the user through light, sound or tactile inputs or outputs, for example. In the example shown in FIG. 5, the UE 500 includes a microphone/speaker 524, a keypad 526, and a display 528 connected to the user interface 522. Alternatively, the user's tactile input or output may be integrated with the display 528 by using a touch-screen display, for example. Once again, the elements illustrated in FIG. 5 are not intended to limit the configuration of the UEs disclosed herein and it will be appreciated that the elements included in the UE 500 will vary based on the end use of the device and the design choices of the system engineers.

Additionally, the UE 500 may be a user device such as a mobile device or external network side device in communication with but separate from the UT 400 as illustrated in FIG. 1, for example. Alternatively, the UE 500 and the UT 400 may be integral parts of a single physical device.

In the example shown in FIG. 1, the two UTs 400 and 401 may conduct two-way communication with the satellite 300 via return and forward service links within a beam coverage. A satellite may communicate with more than two UTs within a beam coverage. The return service link from the UTs 400 and 401 to the satellite 300 may thus be a many-to-one channel. Some of the UTs may be mobile while others may be stationary, for example. In a satellite communication system such as the example illustrated in FIG. 1, multiple UTs 400 and 401 within a beam coverage may be time-division-multiplexed (TDM'ed), frequency-division-multiplexed (FDM'ed), or both.

At some point in time, a UT may need to be handed-off to another satellite (not shown in FIG. 1). Handoff may be caused by scheduled events or unscheduled events.

Several examples of handoff due to scheduled events follow. Inter-beam and inter-satellite handoff may be caused by movement of the satellite, movement of the UT, or a satellite beam being turned off (e.g., due to a Geo-stationary satellite (GEO) restriction). Handoff also may be due to a satellite moving out of the GN's range while the satellite is still within the UT's line of sight.

Several examples of handoff due to nonscheduled events follow. Handoff may be triggered by a satellite being obscured by an obstacle (e.g., a tree). Handoff also may be triggered due to a drop in channel quality (e.g., signal quality) due to rain fade or other atmospheric conditions.

In some implementations, at a particular point in time, a particular satellite may be controlled by a particular entity (e.g., a network access controller, NAC) in a GN. Thus, a GN may have several NACs (e.g., implemented by the GN controller 250 of FIG. 2), each of which controls a corresponding one of the satellites controlled by the GN. In addition, a given satellite may support multiple beams Thus, over time, different types of handoff may occur.

In inter-beam handoff, a UT is handed-off from one beam of a satellite to another beam of the satellite. For example, the particular beam serving a stationary UT may change over time as the serving satellite moves.

In inter-satellite handoff, a UT is handed-off from the current serving satellite (referred to as the source satellite) to another satellite (referred to as the target satellite). For example, a UT may be handed-off to the target satellite as the source satellite moves away from the UT and the target satellite moves toward the UT.

In some aspects, the disclosure relates to a satellite network providing information about one or more satellites to a wireless communication node (e.g., a UT) to enable the wireless communication node to identify a candidate beam for subsequent communication. For example, a UT may use the information to identify all cells in the neighborhood of the UT that are candidates for the UT's next cell reselection operation. Accordingly, a UT can acquire this information in an efficient manner (e.g., in contrast with distributed data acquisition techniques where each device in a network has to separately acquire information from nearby devices one device at a time). In some aspects, the information may include beam pointing information, a beam start angle, a beam span, or any combination thereof. In some aspects, the network may send the information via a neighbor cell list.

Neighbor Cell List

Figure 6:
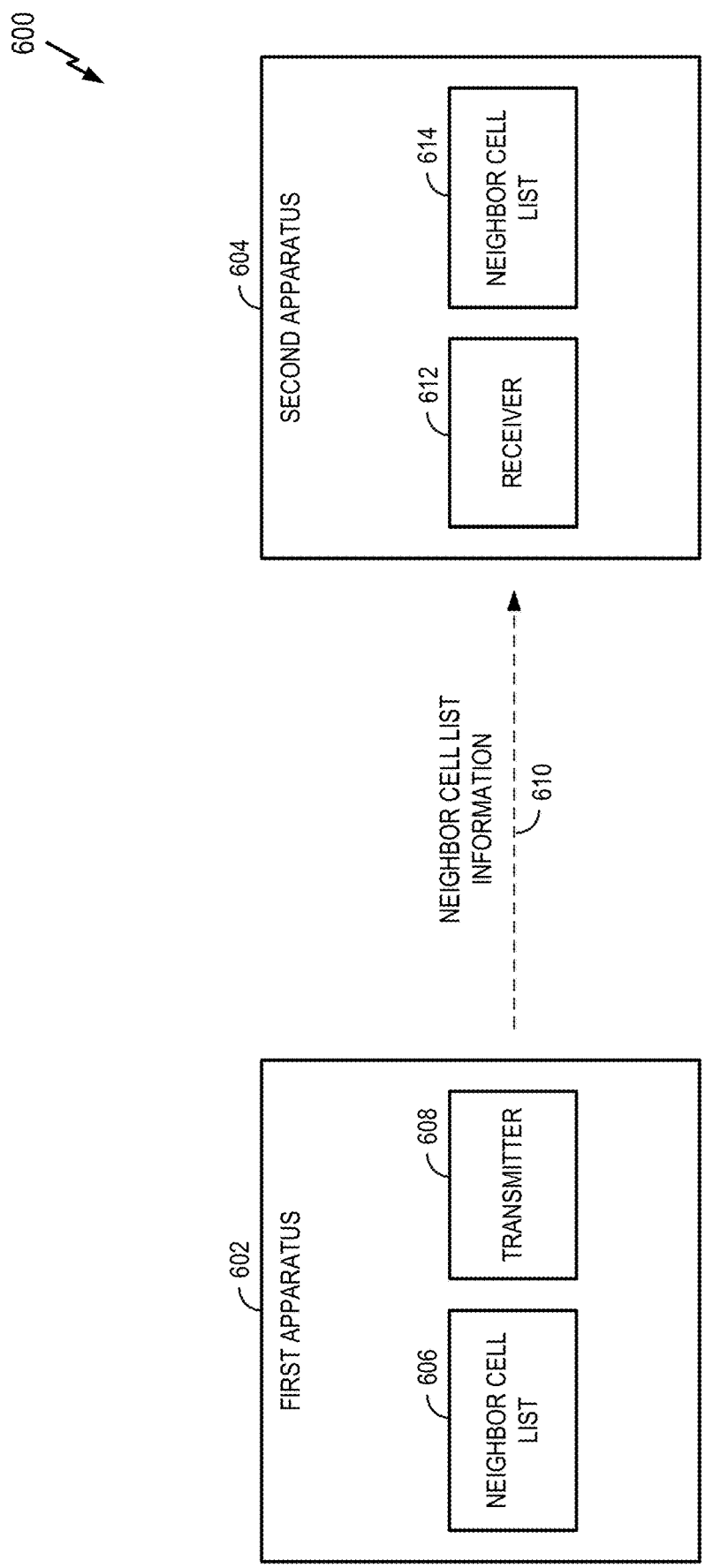
FIG. 6 is a block diagram illustrating example transmitter and receiver devices in accordance with some aspects of the disclosure.

The disclosure relates in some aspects to managing and communicating neighbor cell list information. FIG. 6 illustrates a communication system 600 that includes a first apparatus 602 and a second apparatus 604. The first apparatus 602 maintains (e.g., generates) a neighbor cell list 606 and includes a transmitter 608 that can transmit neighbor cell list information 610 to the second apparatus 604. The second apparatus 604 includes a receiver 612 for receiving the neighbor cell list information 610 such that the second apparatus 604 can maintain a local neighbor cell list 614.

Figure 7:
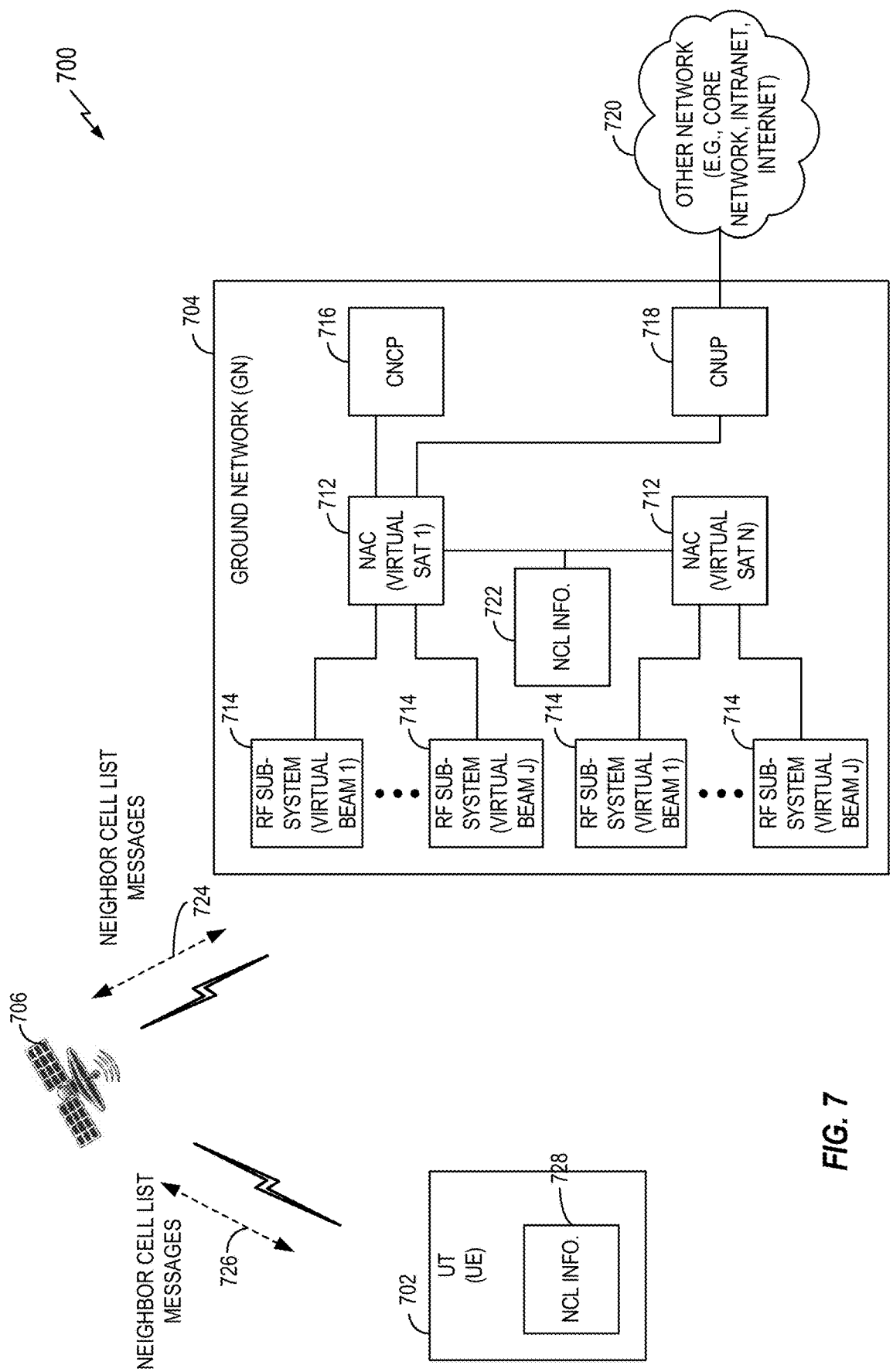
FIG. 7 is a block diagram of an example communication system in accordance with some aspects of the disclosure.

In some implementations, the communication system 600 is a satellite communication system. FIG. 7 illustrates a UT 702 in communication with a GN 704 via a satellite 706 in a non-geosynchronous satellite communication system 700, such as a LEO satellite communication system for data, voice, video, or other communication. The UT 702, the GN 704, and the satellite 706 may respectively correspond to, for example, the UT 400, the GN 200, and the satellite 300 of FIG. 1. The UT 702 and the GN 704 may respectively correspond to, for example, the second apparatus 604 and the first apparatus 602 of FIG. 6.

The GN 704 includes network access controllers (NACs) 712, each of which interfaces with one or more radio frequency (RF) subsystems 714 for communicating with the UT 702 and other UTs (not shown) via the satellite 706 (or some other satellite, not shown). The GN 704 also includes a core network control plane (CNCP) 716 and a core network user plane (CNUP) 718, or other similar functionality, for communicating with another network 720. The network 720 may represent, for example, one or more of a core network (e.g., 3G, 4G, 5G, etc.), an intranet, or the Internet.

The GN 704 may determine (e.g., receive or generate) neighbor cell list (NCL) information 722. The GN may then broadcast or unicast the neighbor cell list information 722 to the UT 702 via messages 724 and 726 relayed by the satellite 706. The UT 702 thereby maintains its own neighbor cell list information 728.

In an example non-geosynchronous satellite communication system implementation, satellites move over the earth in ascending or descending paths (e.g., approximately a north-south or south-north direction). The rotation of the earth causes an apparent motion in the east-west direction. Each UT obtains the expected path of the satellites (satellite information) that the UT is going to see for some prescribed period of time in the future so that it can establish radio connections to the satellites. In some aspects, the UT can receive this satellite information via a broadcast message and/or a unicast message from the network (e.g., from a GN). In some aspects, the UT can request this satellite information if it is not available and has not been provided to it by the network in reasonable time. The disclosed implementations may work at all longitude and latitude values, including satellite constellation designs where satellites in adjacent planes are moving in opposite directions. The disclosed implementations may also provide for unambiguous storage of the satellite ephemeris information and discard of this information if it becomes stale.

In accordance with the teachings herein, a UT may determine the neighboring beams/cells that the UT can reselect to when the current beam/cell becomes weak. To this end, the UE may determine the satellite attitude (pitch, roll, yaw) profile of neighboring satellites, the pointing angles of their beams, and the ON-OFF schedules of their beams. The overall system information broadcast solution may be used during a power save mode of the satellite (e.g., when only a limited set of resources are available and large Broadcast Information Block (BIBs) may have to be segmented). The disclosed techniques may also allow for larger Broadcast Information (BI) windows for the larger BIBs and also specify rules for re-assembly of BIB segments across BI windows.

In accordance with the teachings herein, a cell selection algorithm of a UT may prepare a list of the nearest satellites based on the UT's location, the current time, and ephemeris information. The UT may then find a candidate beam by using neighbor cell list information that provides information about one or more of the attitude profile of a satellite (pitch, roll, and yaw) and the pointing angle, frequency, cell identity, and on-off schedule of a beam.

Neighbor cell list information may be carried in a Broadcast Information Block Type 4 message (referred to herein as BIB4). The BIB4 contains all of the neighbor cells which are candidates for next cell reselection for all of the UTs under the footprint of a broadcasting beam/cell. A UT may read BIB4 both in IDLE mode and CONNECTED mode. Ephemeris information may be received in Broadcast Information Block E messages (BIBe) and Radio Ephemeris Information Response messages from a network.

Example BIB Structure

Figure 8:
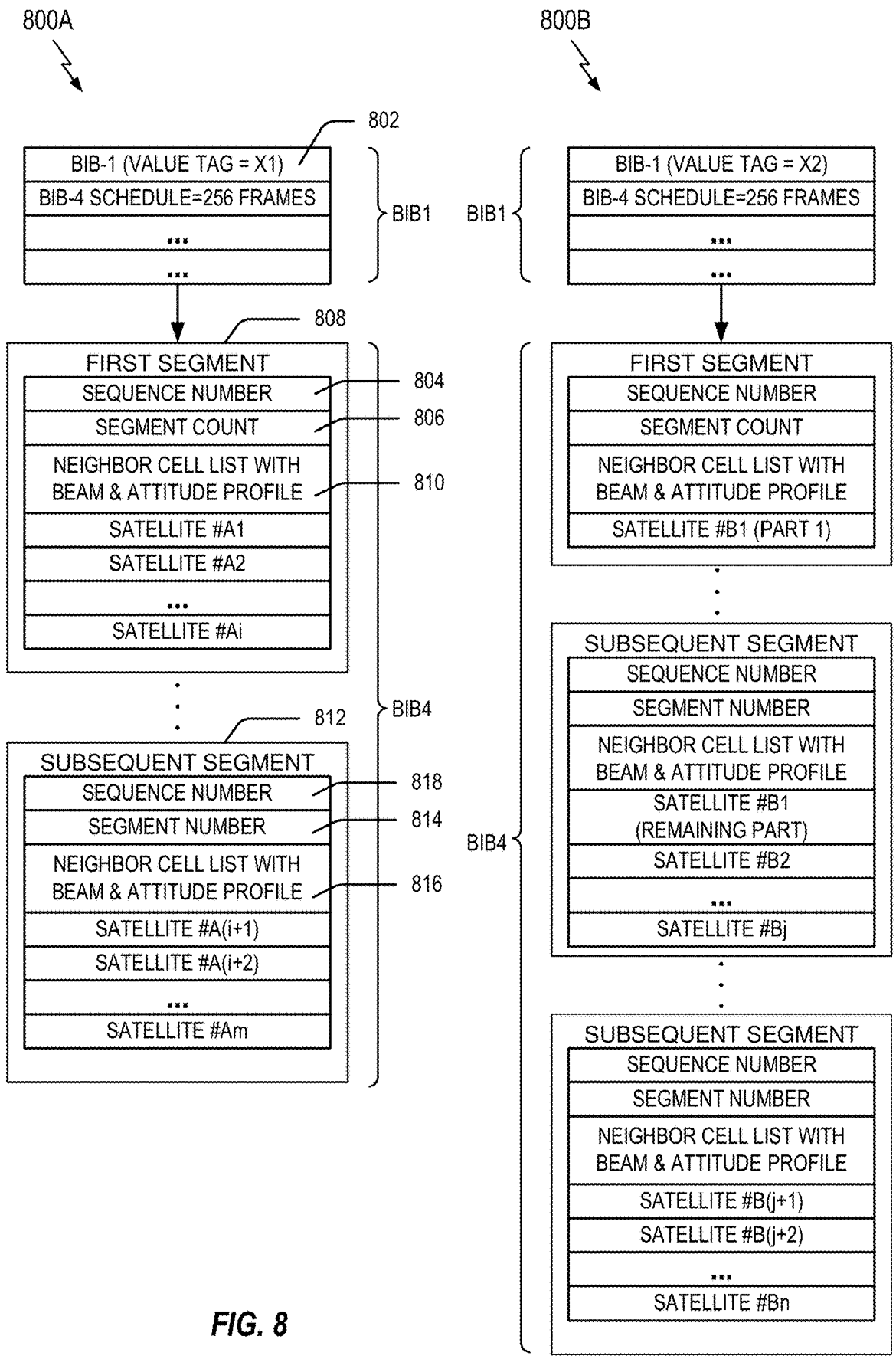
FIG. 8 is a diagram illustrating an example of neighbor cell list (NCL) transmission in accordance with some aspects of the disclosure.

FIG. 8 illustrates an example of BIB4 structures 800A and 800B for different sizes of beam lists. As indicated, BIB4 may follow a Broadcast Information Block Type 1 message (referred to herein as BIB1). The value tag (e.g., a value tag 802) included in the BIB1 may change for any updates to BIB4. A UT may read BIB4 on cell re-selection, when the BIB1 value tag changes, or at some other time. A proposed periodicity of the BIB4 is 2.56 seconds in an example implementation. The figures provided here are only for illustration; the information and parameter values may differ in different implementations.

Example Message Structure

The BIB4 message structure may support segmentation of neighbor cell list information into multiple self-decodable BIB4 segments. A complete neighbor cell list information for a list of satellites may be marked with a sequence number (e.g., a sequence number 804). The sequence number may be incremented when the neighbor cell list contents of the BIB4 change.

The list may be divided into a number of segments depending on available radio resources. The total number of segments (e.g., a segment count 806) may be provided in the first segment (e.g., a first segment 808) of BIB4 along with a part of the neighbor cell list information (e.g., an NCL with beam and attitude profile information 810). All subsequent segments (e.g., a subsequent segment 812) may carry a corresponding segment number (e.g., a segment number 814) and other parts of the neighbor cell list information (e.g., NCL 816). Each segment of BIB4 may contain the sequence number (e.g., a sequence number 818) associated with the neighbor cell list information.

A UT may use a sequence number in BIB4 segments to re-assemble BIB4 across multiple BI-windows. The BIB4 segments that are used to re-assemble the BIB4 message may have the same sequence number across all those BIB4 segments.

In case a UT receives a BIBe segment with a sequence number different from the one included in the BIB4 segments the UT has previously received and stored for re-assembly, the UE may discard all the previously received BIB4 segments (i.e. those having a sequence number different from the one received in the latest BIB4 segment).

A BIB4 segment may contain a list of beams/cells belonging to a satellite. A BIB4 segment may contain the information for some or all of the beams of a satellite. In case of a large number of beams per satellite, the beam information may be sent in parts across multiple BIB4 segments. In some cases, a segment contains the information for an integer number of beams. The satellite identity may be used as a key to combine partial information from such segments to create full information for a satellite.

A UT may decode and use the information contained in individual BIB4 segments even before all the BIB4 segments have been received and the complete BIB4 has been re-assembled. However, BIB4 reading may be deemed complete when the UT receives all segments of the BIB4.

Example NCL Elements

The neighbor cell list (NCL) Information in BIB4 may contain beam/cell information for all neighboring beams which are probable candidates for cell-reselection. The NCL may be structured as a list of per-satellite information blocks. Each information block may contain a list of beams/cells belonging to the satellite. There may be a number of top-level BIB4 Information Elements (IEs) as well as per-satellite and per-beam IEs describing a neighbor. A beam can be optionally indicated to be ON during a given period (e.g., start time and duration), implicitly indicating it to be OFF at other times.

Beam/Cell information per satellite may include, for example, a Satellite Identifier Number, a Satellite Reference Time, an Attitude Profile, and a Beam List.

A Satellite Identifier Number (Id) may uniquely identify a satellite within the system. In some implementations, the length of this field may be 16 bits. In some cases, this field may be over-provisioned to allow for any unanticipated growth in the number of satellites.

A Satellite Reference Time (Rt) may indicate the reference Global Positioning System (GPS) time in seconds. In some implementations, the length of this field may be 32 bits. In some cases, this field may be used as a reference time for defining a Beam ON schedule in BIB4. This field may also be used as a reference time for other BIB4 IEs that deal with time (e.g., IEs related to the satellite attitude profile).

An Attitude Profile (Ap) may indicate the attitude of a satellite beam (e.g., at least one of the pitch, roll, or yaw of the satellite) at various latitudes or at different time instances or during different time periods. The attitude profile can be defined by an equation (which could be Cosine, Quadratic, etc.). As one example, a satellite pitch profile (Pp) can be calculated using, for example, the following parameters: Pitch Magnitude, Start Pitch, End Pitch and Flip Pitch. As another example, a satellite roll profile (Rp) can be calculated using corresponding roll parameters (e.g., particular latitudes, particular time instances, particular time periods, or any combination thereof). In some aspects, the attitude information may be a function of time (e.g., a particular attitude value is valid for a particular period of time). In some aspects, the attitude information may be defined according to a linear approximation (e.g., function) or some other function.

In some cases, this field may be defined as an octet string to contain values of the above-mentioned parameters and any further parameters required for enhancing accuracy. The field length may be 100 bits in an example implementation.

A Beam List (Bl) may indicate the beam information for all beams in a satellite. The list may contain information regarding a maximum of beams (e.g., 64 beams in an example implementation). The beam information may include, for example, Beam Pointing Angle, Beam Frequency Absolute Radio Frequency Channel Number (ARFCN), Beam Physical Cell Id, and Beam On Schedule.

A Beam Pointing Angle may include, for example, an elevation angle and an azimuth angle. The elevation angle may indicate the pointing angle of a beam with reference to the body frame of the satellite and/or the motion of the satellite. The azimuth angle may indicate the pointing angle of a beam with reference to the direction perpendicular to the motion of the satellite and/or the body frame of the satellite. In some aspects, the beam pointing angle may be relative to the body of the satellite.

A Beam Frequency ARFCN is the frequency number. The Beam Frequency may have a maximum value defined to be 65,535 in an example implementation.

A Beam Physical Cell Id is the cell identity. This may have a range 0 . . . 255 in an example implementation.

A Beam On Schedule may define the ON-OFF pattern for a beam by signaling a number of ON durations. In polar and equatorial regions, this parameter may capture the true ON/OFF durations of a beam. In seam regions, this parameter may also capture the visibility period of a neighboring beam with respect to the broadcasting beam. The beam ON schedule may, for example, be signaled using On Start Time and On Duration parameters. The On Start Time may indicate the time from which a beam is switched ON. A signaled corresponding IE value may indicate the number of seconds elapsed since the Satellite Reference Time signaled in the same occurrence of BIB4. The On Duration may indicate the duration in seconds for which a beam stays switched ON from the On Start Time signaled in the same schedule entry.

Table 1 illustrates a summary of the above neighbor cell elements according to one example.

TABLE 1

| Field | Description |
| --- | --- |
| Neighbor Cell List Information | NCL information per satellite |
| > Satellite Identity | Satellite Identity |
| > Satellite Reference Time | Reference GPS Time for all time points in BIB4 |
| > Satellite Attitude Profile | May use an attitude (e.g., pitch, roll, or yaw) profile of the previous satellite in this message, if this IE is absent. The IE may be mandatory for the first satellite in the list. |
| > Beam List Information: | NCL information per beam |
| >> Beam Pointing Angle: | |
| >>>> Elevation Angle | Example Granularity 0.03, range = −61.44:0.03:+61.41 |
| >>>> Azimuth Angle | Example Granularity 0.03, range = 0.00:0.03:360.00 |
| >> Beam Frequency ARFCN | |
| >> Beam Physical Cell Id | |
| >> Beam On Schedule: | "On" schedule for the beam |
| >>>> On Period Start Time | Counted in seconds from the Satellite Reference Time |
| >>>> On Period Length | Duration in seconds for which the beam stays on |

Example Beam List

The BIB4 of a particular beam may include information about all the beams that any UT under that particular beam's footprint may have as the next reselection target. Therefore, the number of beams included in BIB4 may be a function of the local latitude as well as whether the broadcasting beam is located on a seam.

Figure 9:
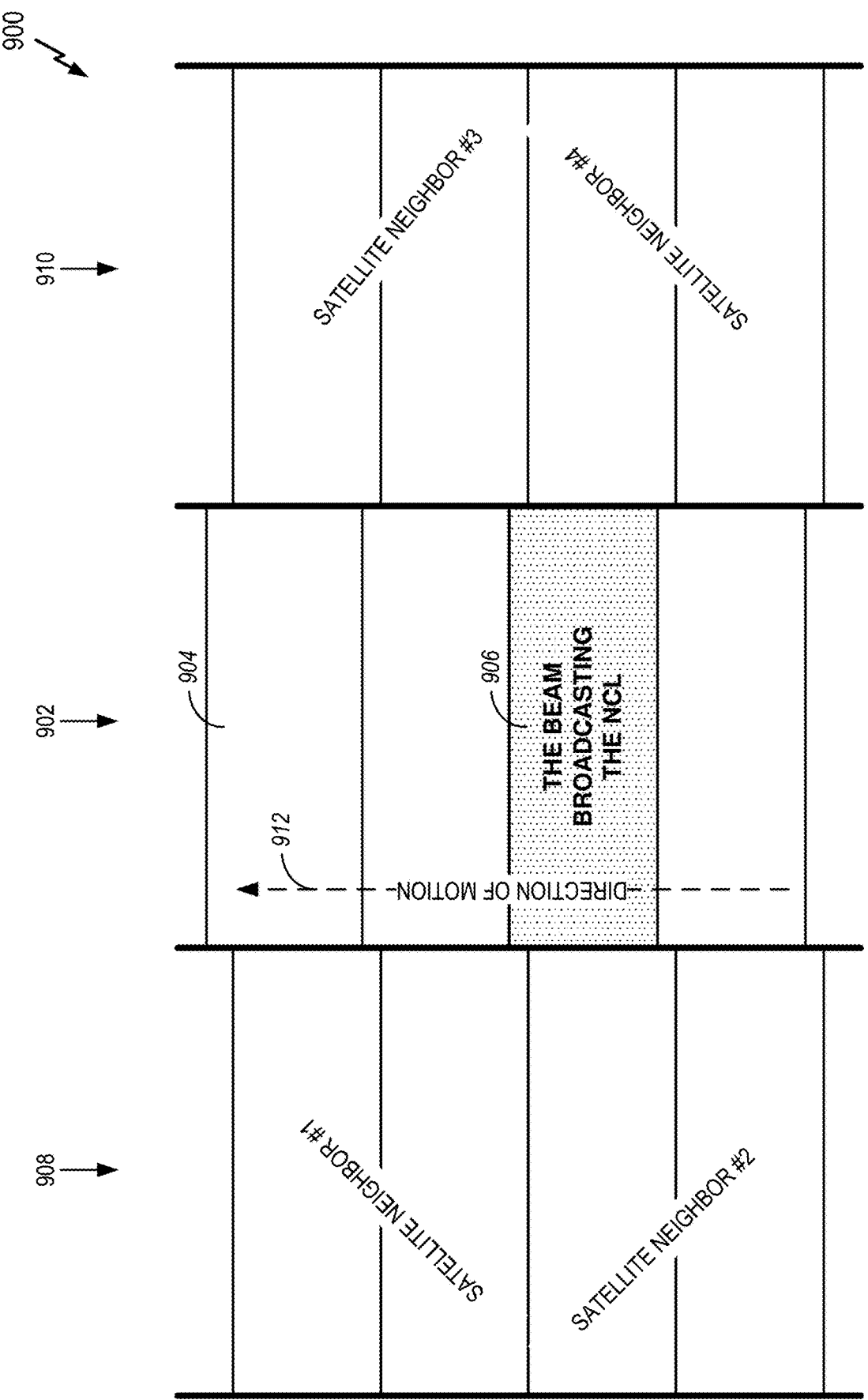
FIG. 9 is a diagram illustrating an example of normal neighbor cell list (NCL) transmission in accordance with some aspects of the disclosure.

FIG. 9 illustrates an example of a normal operation for the case of 3+1+3 neighboring beams. The central column 902 shows the beams from a particular satellite (e.g., at a particular moment in time). Simplified example beam patterns 904 and 906 for different beams are indicated by the rectangles. The beam pattern 906 broadcasts an NCL in this example. The columns 908 and 910 show the beams from neighbor satellites (designated satellite neighbors #1, #2, #3, and #4) of the particular satellite. The beams have a direction of motion 912 (e.g., south-to-north) in this example.

Example Operation Near the Seams

A seam is a location where the motions of the satellites in two neighboring planes are in the opposite directions (e.g., where North-bound and South-bound satellites are next to each other). In some cases, there may be two seams in the system.

Figure 10:
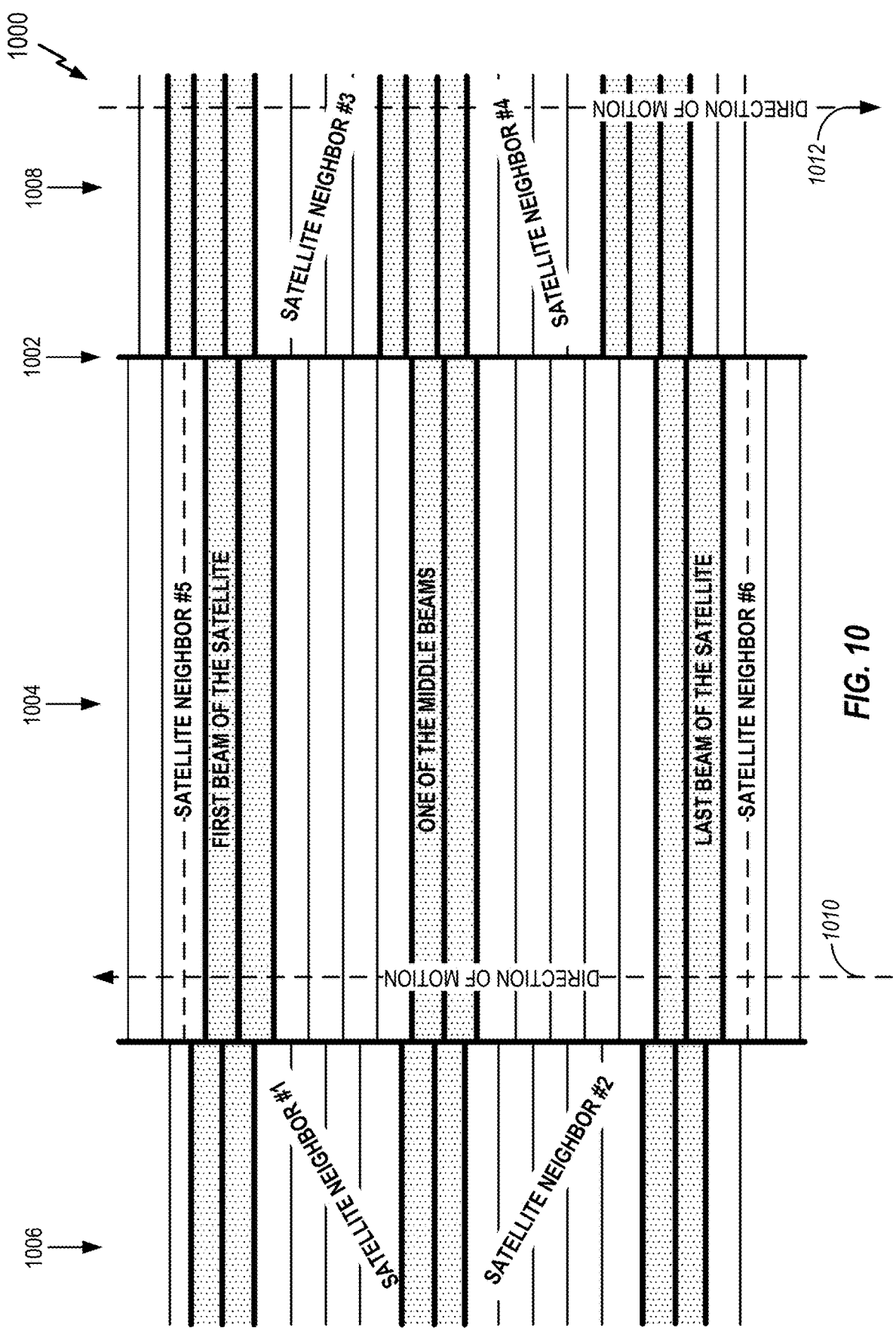
FIG. 10 is a diagram illustrating an example of seam neighbor cell list (NCL) transmission in accordance with some aspects of the disclosure.

FIG. 10 illustrates an example of beam patterns 1000 in the vicinity of a seam 1002. The central column 1004 shows the beams from a particular satellite (e.g., at a particular moment in time) and that particular satellite's immediate neighbor satellites (designated satellite neighbors #5 and #6) that follow the same path. The columns 1006 and 1008 show portions of the beams from other neighbor satellites (designated satellite neighbors #1, #2, #3, and #4) of the particular satellite. The beams of columns 1004 and 1006 have a direction of motion 1010 (e.g., south-to-north), while the beams of column 1008 on the other side of the seam 1002 have an opposite direction of motion 1012 (e.g., north-to-south).

As indicated in FIG. 10, the beams to be included near the seams may be a mirror image of those that would have been included if the motion of the different plane was in the same direction. This also means that the broadcasting beam may have different neighboring beams at different times belonging to the plane moving in the other direction. Therefore, the NCL may include a number of beams together with the time durations at which those will become neighbors of the broadcasting beam. This allows the NCL contents to be pre-calculated and stay unchanged for longer periods.

Example NCL Parameters

In an example implementation, the elements of an NCL may include a number of satellites, a number of beams, a Segment Count, Sequence Numbers, and On Schedule entries. The number of satellites in the Neighbor Cell List may be 1 . . . 32 in an example implementation. The number of beams per satellite in the Neighbor Cell List may be 1 . . . 64 in an example implementation.

The total number of beams (across all satellites) included in the neighbor cell list may be a function of the latitude and whether the beam belongs to a seam plane. A proposed value of the total number of beam to be included for the typical latitude is 6-8 beams in an example implementation. For the equator and the poles, the total number of beams may be increased to 10-12 beams in an example implementation. For operation near the seams, an additional 16 beams of one satellite may provide approximately 1.5 minutes for which the BIB4 contents may remain constant (for a constellation of 648 satellites).

The Segment Count is a function of the number of satellites and beams in the list and radio resources available for BIB4 transmission. The range of the Segment Count may be 1 . . . 32 in an example implementation.

An initial setup of 5-6 satellites and 7-8 beams may use approximately 100 resource blocks (RBs) in an example implementation. For polar latitudes and the equator, approximately 200 RBs may be used in an example implementation. At the seams, an additional 100 RBs per satellite may be used in an example implementation.

In a normal mode of operation, the maximum BIB size may be 8,760 bits (e.g., approximately 650 resource blocks) in an example implementation. Hence, if the available RBs are less than 650, BIB4 would use one segment in an example implementation.

For a power save mode, the maximum available resource blocks may be approximately 54 in an example implementation. Hence, BIB4 may typically use a maximum of 4 segments at all non-seam locations and a variable number of segments at the seams, depending upon the duration for which the BIB4 contents are targeted to stay unchanged.

The Sequence Number may be changed whenever SAN modifies the neighbor cell list information. Worst case BIB4 contents may change maximum once within 10 seconds in an example implementation. The range of Sequence Numbers may be 0 . . . 3 in an example implementation. This number may be over-provisioned to allow for any unanticipated scenarios.

The range of On Schedule Entries may be 1 . . . 4 in an example implementation. A beam might not be turned on and off many times in quick succession (e.g., within 15-20 minutes, for which the BIB4 contents may be targeted to stay unchanged). The number of entries can be limited to 4 in an example implementation: four ON periods also signal three intervening OFF periods.

All the above parameters may be a function of available radio resources, the number of satellites, cells, beams, and the periodicity of BIB4. These parameters may be tuned to get minimum delay in BIB reading and maximum coverage.

Example Reception Operation

BIB4 may be received by a UT in IDLE mode to enable the UT to conducts measurements on candidate beams/cells for cell-reselection. BIB4 also may be received by a UT in CONNECTED mode for enabling a quick transition to IDLE mode when needed. BIB4 may be read when a UT camps on to a new cell. BIB may be broadcast with a periodicity of 2.56 seconds in an example implementation.

A change in BIB contents may be covered under BIB1 Value Tag management. Hence, a UT might not be required to read the BIB contents again on the same cell unless the value tag changes. A UT may stay on a cell for approximately 10 seconds (e.g., with dwell time of 7-8 seconds). Hence, at a minimum, a UT gets 2 occasions (maximum 4 occasions) to read BIB4 in this example.

Example Storage Operation

The BIB4 content might only be valid within a cell. Consequently, every time the UT does a cell re-selection or cell selection (e.g., moving from CONNECTED to IDLE, or Radio Link Failure), the UT may read BIB4.

Scheduling Changes

The scheduling changes that follow may be used in an example implementation.

For version control, BIB4 may be covered by a version control mechanism of BIB1 Value Tag. Once a UT has read BIB4 in a cell, the UT may skip reading BIB4 again in the same cell if there is no change in the BIB1 value tag.

Regarding scope, BIB4 may be valid in the scope of a cell. On cell reselection, a previously read BIB4 becomes invalid. The UT thus reads BIB4 again in the new cell.

For periodicity and repetition, BIB4 (neighbor cell information list) may be transmitted every 2.56 seconds to ensure that a UT can attempt 2-3 readings in an example implementation. This may correspond to a dwell time of 7-8 seconds. Thus, a UT will get a minimum of 2 and a maximum of 4 read attempts in a cell in this example. Neighbor cell information can be transmitted in 32 segments of BIB4. A higher number of segments might be used in a power save mode. BIB4 may use a bigger BI window in a power save mode. A new BIB4-specific BI window may be defined in BIB1 (e.g., which can be of size 5/10/15/20/40 milliseconds (ms), etc., to accommodate a defined maximum number of BIB4 segments).

BIB4 may be sent in a separate BI message. BIB4 may be transmitted in the penultimate BI window.

When acquiring a BI message, the UE may perform the two operations that follow.

The first operation involves determining the start of the BI window for the concerned BI message. This operation includes three steps.

The first step for the first operation involves, for all BI messages except the last (i.e., the one carrying Broadcast Information Block Type E), determining the number n which corresponds to the order of entry in the list of BI messages configured by a Scheduling Info List in Broadcast Information Block Type 1. In addition, this step involves determining the integer value $x=(n-1)*w$, where w is the BI Window Length.

The second step for the first operation involves, for the last BI message (i.e., the one carrying Broadcast Information Block Type E), determining the number n which corresponds to the order of entry in the list of BI messages configured by the Scheduling Info List in Broadcast Information Block Type 1. In addition, this step involves determining the integer value $x=(n-2)*w+w\text{-BIB4}$, where w is the BI Window Length and w-BIB4 is the BIB4 Broadcast Information Window Length.

In the third step for the first operation, the BI window starts at the subframe #a, where $a=x \bmod 10$, in the radio frame for which SFN mod $T=\text{FLOOR}(x/10)$, where T is the BI Periodicity of the concerned BI message. The network may configure an BI window of 1 millisecond (ms) if all BIs are scheduled before subframe #5 in radio frames for which SFN mod 2=0.

The second operation involves receiving information (e.g., DL-SCH) using a subscriber identifier (e.g., BI-RNTI) from the start of the BI window and continuing until the end of the BI window that has an absolute length in time given by BI Window Length, or until the BI message was received, excluding subframe #5 in radio frames for which SFN mod 2=0.

Figure 11:
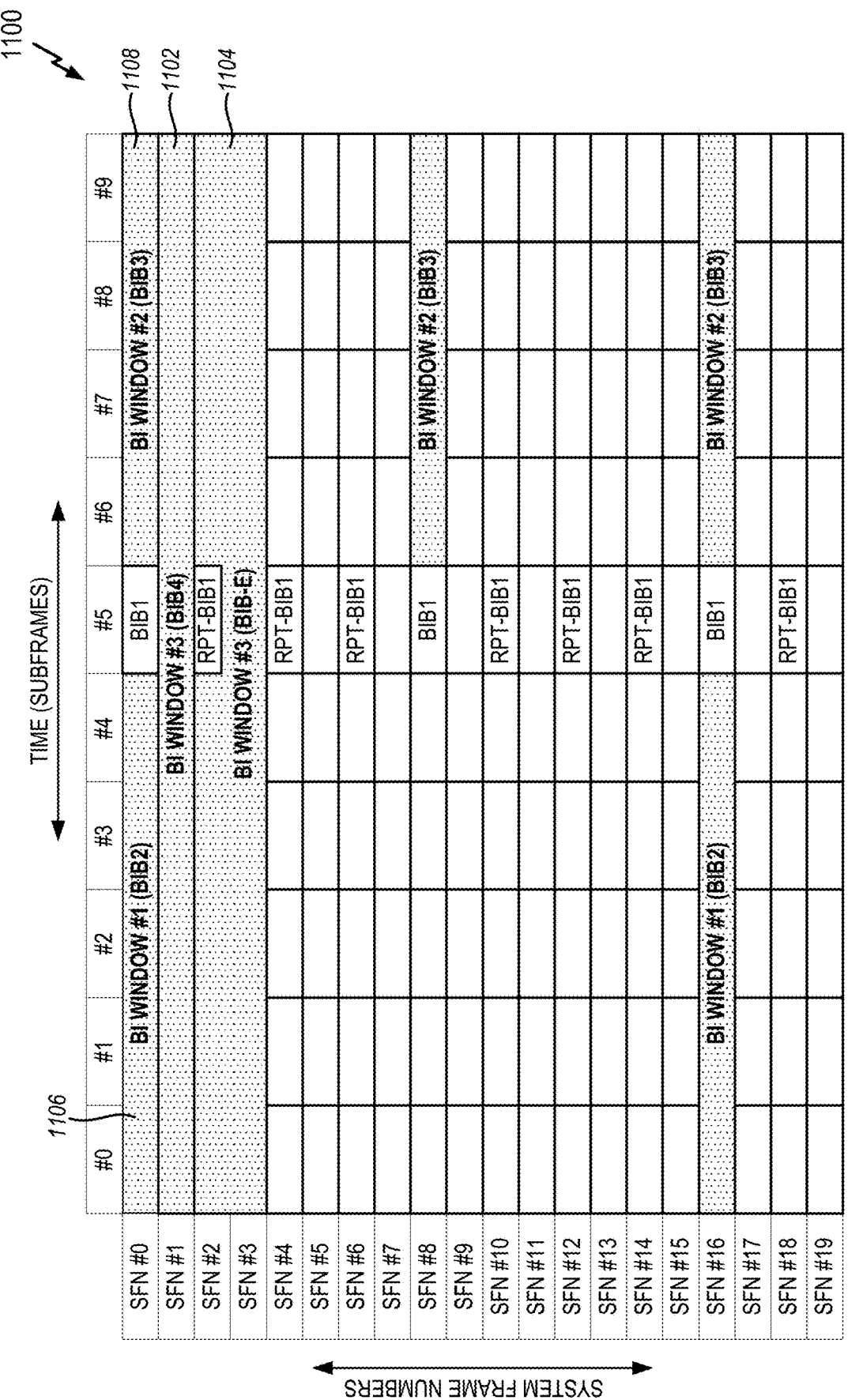
FIG. 11 is a diagram illustrating example scheduling over sub-frames in accordance with some aspects of the disclosure.

FIG. 11 is an example BIB schedule 1100 with a BIB4 window 1102 and a BIBe window 1104 (e.g., default BI window size=5 ms). In an example implementation, BIB2 (e.g., the BIB2 window 1106) has a periodicity of 160 ms and BIB3 (e.g., the BIB3 window 1108) has a periodicity of 80 ms. The BI window for BIB4 has a size=10 ms in an example implementation. The BIB4 periodicity is 2560 ms in an example implementation. The BI window for BIBe has a size=20 ms in an example implementation. The BIBe periodicity is 5120 ms in an example implementation.

First Example Acquisition Process

Figure 12:
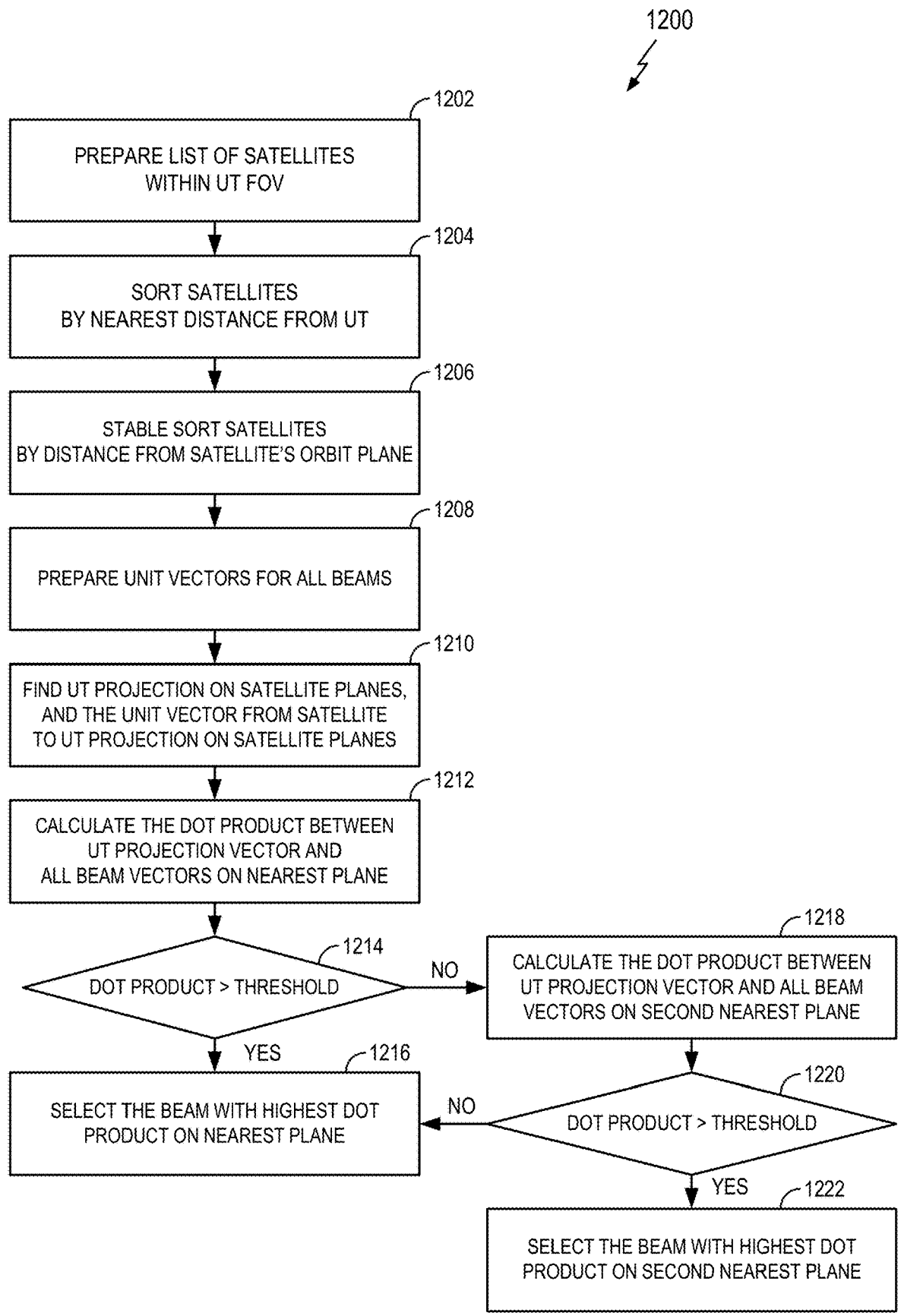
FIG. 12 is a flowchart illustrating an example of an idle mode acquisition process in accordance with some aspects of the disclosure.

FIG. 12 illustrates an example of an idle mode acquisition process 1200 that may be performed by a UT or some other suitable apparatus. The process uses input parameters obtained from the NCL information (e.g., received from the GN).

In this example, the inputs include Satellite Identity; Satellite Reference Time; Satellite Pitch Profile; and Beam List Information. The Beam List Information includes Beam Pointing Angle (e.g., Elevation Angle and Azimuth Angle); Beam Frequency ARFCN; Beam Physical Cell ID; Beam ON Schedule (e.g., ON Period Start Time and ON Period Length); and Beam Selection Threshold.

The process 1200 involves the following operations. At block 1202, an apparatus prepares a list of satellites within the UT Field of View (FOV). At block 1204, the apparatus sorts the satellites by the nearest distance from the UT. At block 1206, the apparatus stable sorts the satellites by distance from the satellite's orbit plane. At block 1208, the apparatus prepares unit vectors for all beams. At block 1210, the apparatus finds the UT projection on the satellite planes, and the unit vector from the satellite to the UT projection on the satellite planes. At block 1212, the apparatus calculates the dot product between the UT projection vector and all beam vectors on the nearest plane. At block 1214, the apparatus determines whether the Dot product>the threshold. If so, at block 1216, the apparatus selects the beam with highest dot product on the nearest plane. If the Dot product <=the threshold at block 1214, at block 1218, the apparatus calculates the dot product between the UT projection vector and all beam vectors on the second nearest plane. At block 1220, the apparatus determines whether the Dot product>the threshold. If so, at block 1222, the apparatus selects the beam with highest dot product on the second nearest plane. If the Dot product <=the threshold at block 1220, at block 1216, the apparatus select the beam with the highest dot product on the nearest plane. The sorting method described is one possible implementation. Other sorting methods may be applied.

Here, the UT has the information to camp on the beam (e.g., frequency and cell identity). For example, this information may be provided via the NCL.

Figure 13:
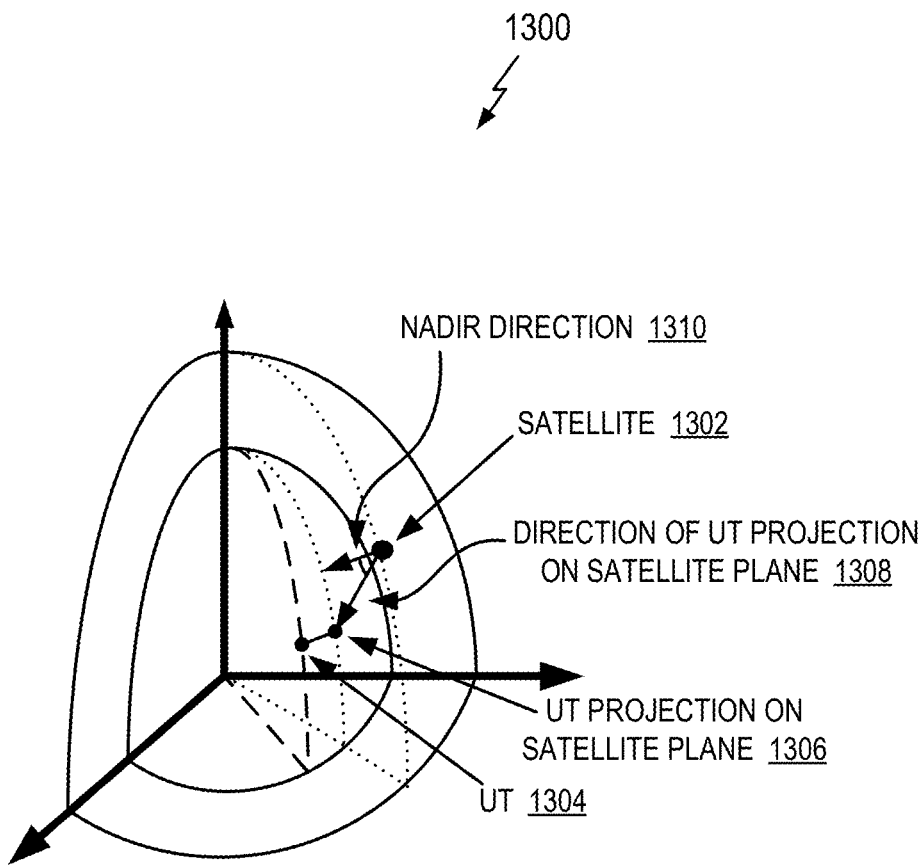
FIG. 13 is a diagram illustrating an example geometry for the process of FIG. 12 in accordance with some aspects of the disclosure.

FIG. 13 illustrates an example geometry 1300 of a satellite 1302 and a UT 1304 for the process 1200. In particular, FIG. 13 shows the UT projection on the satellite plane 1306, the direction of the UT projection on the satellite plane 1308, and the nadir direction 1310.

Second Example Acquisition Process

Figure 14:
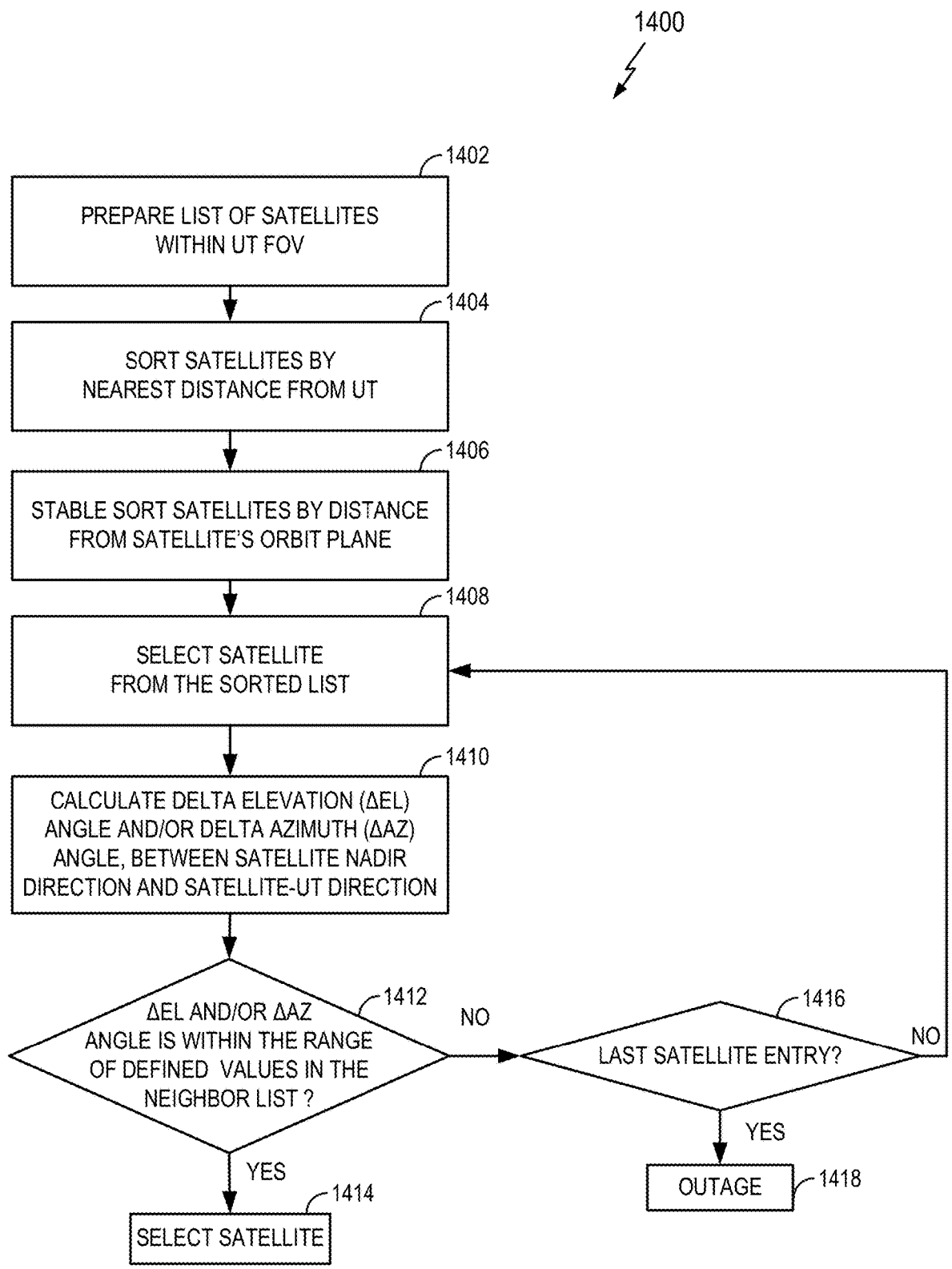
FIG. 14 is a flowchart illustrating another example of an idle mode acquisition process in accordance with some aspects of the disclosure.

FIG. 14 illustrates another example of an idle mode acquisition process 1400 that may be performed by a UT or some other suitable apparatus. In this example, the NCL includes a start angle and a span (e.g., calculated by the GN based on the inputs from the process 1200 and sent from the GN to the UT) instead of the large number of inputs set forth in the process 1200. Thus, in this example, less information may be sent over-the-air (e.g., thereby conserving network resources) and simpler computations may be performed at the UT (e.g., thereby conserving UT resources). In some aspects, the angle may be measured in elevation or azimuth.

In this example, the inputs for the process 1400 include Satellite Identity; Entry Validity (as a function of time or satellite trajectory); Delta Pitch Angle (Start Angle and Span), where start angle is a function of satellite pitch, satellite location with respect to (wrt) the equator and beam ON/OFF, and where Span is a function of beam ON/OFF; Delta Roll Angle (Start Angle and Span); and Yaw angle (e.g., to support yawed footprint profile). In some aspects, the angle may be measured in pitch or roll.

The process 1400 involves the following operations. At block 1402, an apparatus prepares a list of satellites within the UT FOV. At block 1404, the apparatus sorts the satellites by the nearest distance from the UT. At block 1406, the apparatus stable sorts the satellites by distance from the satellite's orbit plane. At block 1408, the apparatus selects the satellite from the sorted list. At block 1410, the apparatus calculates the delta elevation (Δel) angle and/or the delta azimuth (Δaz) angle, between the satellite nadir direction and the satellite-UT direction. At block 1412, the apparatus determines whether the Δel angle and/or the Δaz angle are within ranges defined in the neighbor list. If so, at block 1414, the apparatus selects the satellite. If not, at block 1416, the apparatus selects the next satellite in the list and determines whether the current entry is the last one in the list. If the current entry is not the last one in the list, the operational flow returns to block 1408. If the current entry is the last one in the list, the apparatus declares an outage at block 1418. The sorting method described is one possible implementation. Other sorting methods may be applied.

Here, the UT may determine the information to camp on the beam (e.g., frequency and cell identity). For example, the UT may performs perform frequency and cell searches to find the best beam before camping on a satellite.

Satellite Attitude

Figure 15:
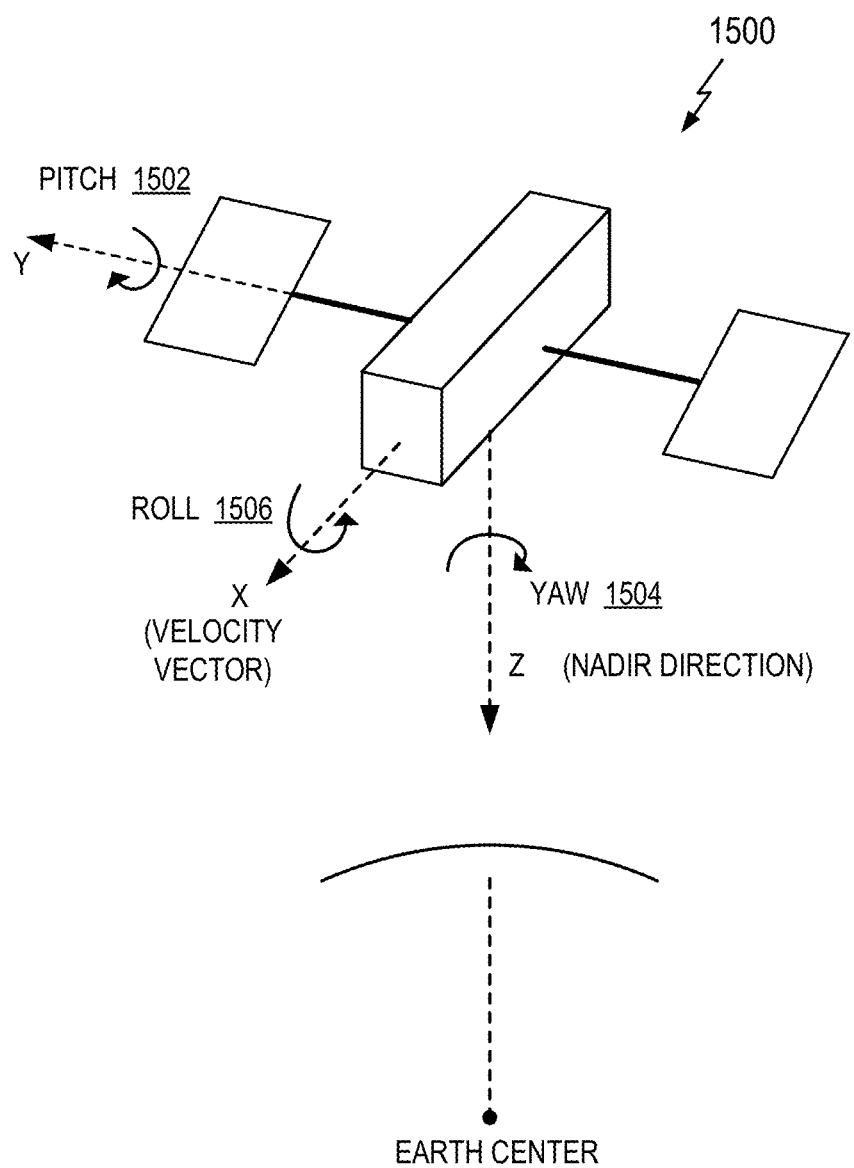
FIG. 15 is a diagram illustrating an example of satellite attitude.

FIG. 15 illustrates an example of attitude for a satellite 1500. In particular, FIG. 15 shows examples of pitch 1502, yaw 1504, and roll 1506 for the satellite 1500. Objects that are free to move in three dimensions, such as satellites, can change their attitude with respect to three orthogonal axes centered on a particular point (e.g., the object's center of gravity). Attitude refers to, for example, the orientation of the object with respect to a particular coordinate system (e.g., the coordinate system defined by the three vectors consisting of the vector in the object's direction of motion, the nadir vector from the object's center to the Earth's center, and a third vector perpendicular to the plane formed by the object's velocity vector and the object's nadir vector). The three axes may also be referred to as the roll axis, the yaw axis and the pitch axis, where the roll axis is the velocity vector, the yaw axis is the nadir axis and the pitch axis is the axis perpendicular to the plane formed by the roll axis and yaw axis.

First Example Apparatus

Figure 16:
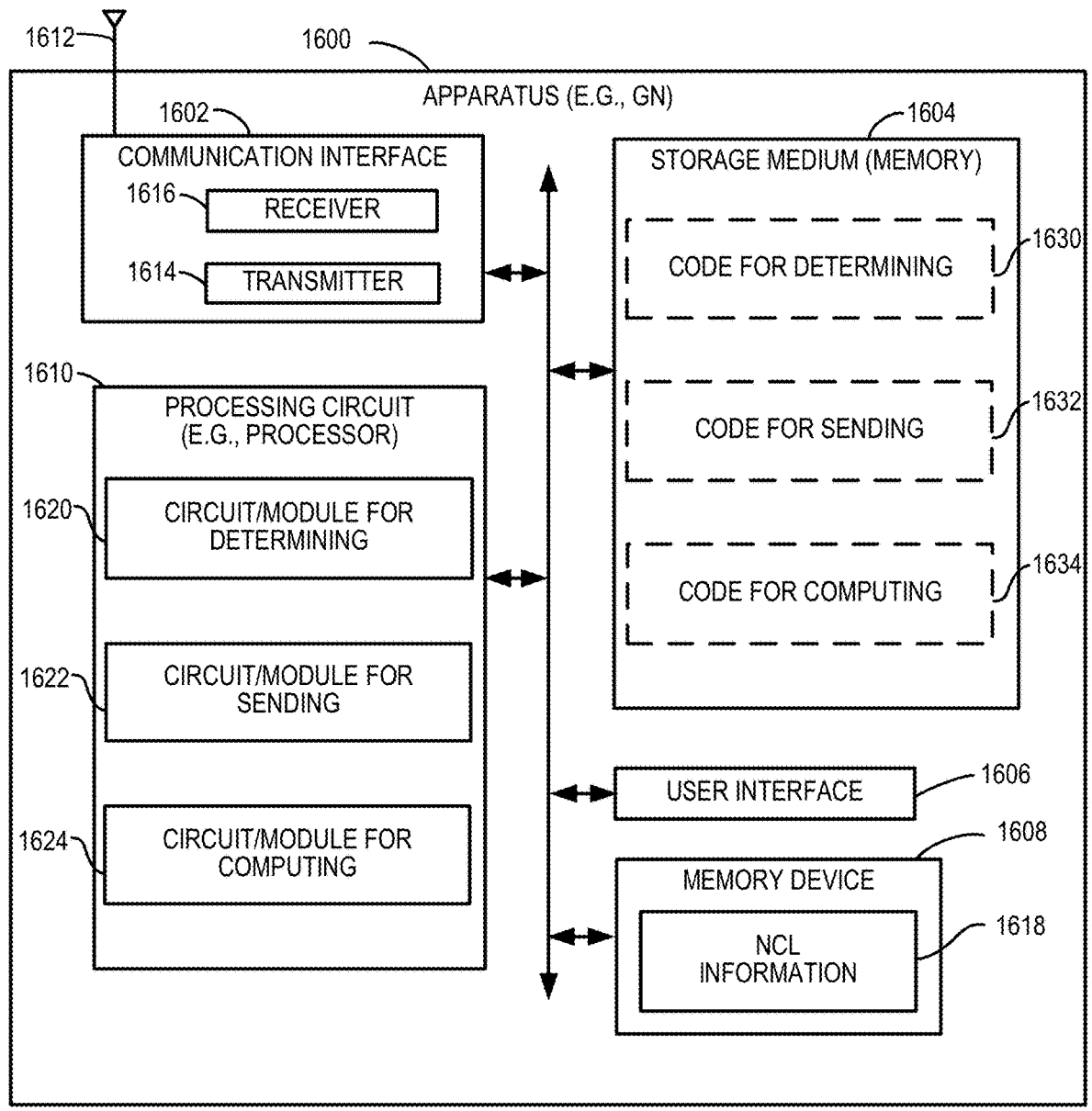
FIG. 16 is a block diagram illustrating an example hardware implementation for an apparatus (e.g., an electronic device) that can support communication of a neighbor cell list in accordance with some aspects of the disclosure.

FIG. 16 illustrates a block diagram of an example hardware implementation of an apparatus 1600 configured to communicate according to one or more aspects of the disclosure. For example, the apparatus 1600 could embody or be implemented within a GN, or some other type of device that supports satellite communication. In various implementations, the apparatus 1600 could embody or be implemented within a gateway, a ground station, a vehicular component, or any other electronic device having circuitry.

The apparatus 1600 includes a communication interface 1602 (e.g., at least one transceiver), a storage medium 1604, a user interface 1606, a memory device (e.g., a memory circuit) 1608, and a processing circuit 1610 (e.g., at least one processor). In various implementations, the user interface 1606 may include one or more of: a keypad, a display, a speaker, a microphone, a touchscreen display, of some other circuitry for receiving an input from or sending an output to a user.

These components can be coupled to and/or placed in electrical communication with one another via a signaling bus or other suitable component, represented generally by the connection lines in FIG. 16. The signaling bus may include any number of interconnecting buses and bridges depending on the specific application of the processing circuit 1610 and the overall design constraints. The signaling bus links together various circuits such that each of the communication interface 1602, the storage medium 1604, the user interface 1606, and the memory device 1608 are coupled to and/or in electrical communication with the processing circuit 1610. The signaling bus may also link various other circuits (not shown) such as timing sources, peripherals, voltage regulators, and power management circuits, which are well known in the art, and therefore, will not be described any further.

The communication interface 1602 provides a means for communicating with other apparatuses over a transmission medium. In some implementations, the communication interface 1602 includes circuitry and/or programming adapted to facilitate the communication of information bi-directionally with respect to one or more communication devices in a network. In some implementations, the communication interface 1602 is adapted to facilitate wireless communication of the apparatus 1600. In these implementations, the communication interface 1602 may be coupled to one or more antennas 1612 as shown in FIG. 16 for wireless communication within a wireless communication system. The communication interface 1602 can be configured with one or more standalone receivers and/or transmitters, as well as one or more transceivers. In the illustrated example, the communication interface 1602 includes a transmitter 1614 and a receiver 1616. The communication interface 1602 serves as one example of a means for receiving and/or means transmitting.

The memory device 1608 may represent one or more memory devices. As indicated, the memory device 1608 may maintain NCL information 1618 along with other information used by the apparatus 1600. In some implementations, the memory device 1608 and the storage medium 1604 are implemented as a common memory component. The memory device 1608 may also be used for storing data that is manipulated by the processing circuit 1610 or some other component of the apparatus 1600.

The storage medium 1604 may represent one or more computer-readable, machine-readable, and/or processor-readable devices for storing programming, such as processor executable code or instructions (e.g., software, firmware), electronic data, databases, or other digital information. The storage medium 1604 may also be used for storing data that is manipulated by the processing circuit 1610 when executing programming. The storage medium 1604 may be any available media that can be accessed by a general purpose or special purpose processor, including portable or fixed storage devices, optical storage devices, and various other mediums capable of storing, containing or carrying programming.

By way of example and not limitation, the storage medium 1604 may include a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The storage medium 1604 may be embodied in an article of manufacture (e.g., a computer program product). By way of example, a computer program product may include a computer-readable medium in packaging materials. In view of the above, in some implementations, the storage medium 1604 may be a non-transitory (e.g., tangible) storage medium.

The storage medium 1604 may be coupled to the processing circuit 1610 such that the processing circuit 1610 can read information from, and write information to, the storage medium 1604. That is, the storage medium 1604 can be coupled to the processing circuit 1610 so that the storage medium 1604 is at least accessible by the processing circuit 1610, including examples where at least one storage medium is integral to the processing circuit 1610 and/or examples where at least one storage medium is separate from the processing circuit 1610 (e.g., resident in the apparatus 1600, external to the apparatus 1600, distributed across multiple entities, etc.).

Programming stored by the storage medium 1604, when executed by the processing circuit 1610, causes the processing circuit 1610 to perform one or more of the various functions and/or process operations described herein. For example, the storage medium 1604 may include operations configured for regulating operations at one or more hardware blocks of the processing circuit 1610, as well as to utilize the communication interface 1602 for wireless communication utilizing their respective communication protocols. In some aspects, the storage medium 1604 may include computer-readable medium storing computer-executable code, including code to perform the functionality described herein.

The processing circuit 1610 is generally adapted for processing, including the execution of such programming stored on the storage medium 1604. As used herein, the terms "code" or "programming" shall be construed broadly to include without limitation instructions, instruction sets, data, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

The processing circuit 1610 is arranged to obtain, process and/or send data, control data access and storage, issue commands, and control other desired operations. The processing circuit 1610 may include circuitry configured to implement desired programming provided by appropriate media in at least one example. For example, the processing circuit 1610 may be implemented as one or more processors, one or more controllers, and/or other structure configured to execute executable programming Examples of the processing circuit 1610 may include a general purpose processor, a digital signal processor (DSP), an application-specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 1610 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 1610 are for illustration and other suitable configurations within the scope of the disclosure are also contemplated.

According to one or more aspects of the disclosure, the processing circuit 1610 may be adapted to perform any or all of the features, processes, functions, operations and/or routines for any or all of the apparatuses described herein. For example, the processing circuit 1610 may be configured to perform any of the steps, functions, and/or processes described with respect to FIGS. 1-15 and 17-19. As used herein, the term "adapted" in relation to the processing circuit 1610 may refer to the processing circuit 1610 being one or more of configured, used, implemented, and/or programmed to perform a particular process, function, operation and/or routine according to various features described herein.

The processing circuit 1610 may be a specialized processor, such as an application-specific integrated circuit (ASIC) that serves as a means for (e.g., structure for) carrying out any one of the operations described in conjunction with FIGS. 1-15 and 17-19. The processing circuit 1610 serves as one example of a means for transmitting and/or a means for receiving. In some implementations, the processing circuit 1610 may provide and/or incorporate, at least in part, the functionality described above for the functionality of the GN controller 250 of FIG. 2.

According to at least one example of the apparatus 1600, the processing circuit 1610 may include one or more of a circuit/module for determining 1620, a circuit/module for sending 1622, or a circuit/module for computing 1624. In various implementations, the circuit/module for determining 1620, the circuit/module for sending 1622, or the circuit/module for computing 1624 may provide and/or incorporate, at least in part, the functionality described above for the functionality of the GN controller 250 of FIG. 2.

As mentioned above, programming stored by the storage medium 1604, when executed by the processing circuit 1610, causes the processing circuit 1610 to perform one or more of the various functions and/or process operations described herein. For example, the programming may cause the processing circuit 1610 to perform the various functions, steps, and/or processes described herein with respect to FIGS. 1-15 and 17-19 in various implementations. As shown in FIG. 16, the storage medium 1604 may include one or more of code for determining 1630, code for sending 1632, or code for computing 1634. In various implementations, the code for determining 1630, the code for sending 1632, or the code for computing 1634 may be executed or otherwise used to provide the functionality described herein for the circuit/module for determining 1620, the circuit/module for sending 1622, or the circuit/module for computing 1624.

The circuit/module for determining 1620 may include circuitry and/or programming (e.g., code for determining 1630 stored on the storage medium 1604) adapted to perform several functions relating to, for example, determining a neighbor cell list. In some aspects, the circuit/module for determining 1620 (e.g., a means for determining) may correspond to, for example, a processing circuit.

Initially, the circuit/module for determining 1620 may obtain information upon which the determination is to be based. For example, the circuit/module for determining 1620 may obtain information as discussed above in conjunction with FIGS. 8-15 (e.g., from the communication interface 1602, the memory device 1608, or some other component of the apparatus 1600). The circuit/module for determining 1620 may then make the determination based on the obtained information. For example, the circuit/module for determining 1620 may generate a neighbor cell list that includes the information of Table 1. In some aspects, the neighbor cell list may include at least one start angle and span for at least one satellite. In some aspects, the neighbor cell list may include beam pointing information for at least one satellite. The circuit/module for determining 1620 may then output the resulting neighbor cell list (e.g., to the circuit/module for sending 1622, the memory device 1608, or some other component).

The circuit/module for sending 1622 may include circuitry and/or programming (e.g., code for sending 1632 stored on the storage medium 1604) adapted to perform several functions relating to, for example, sending (e.g., transmitting) information. In some implementations, the circuit/module for sending 1622 may obtain information (e.g., from the memory device 1608, or some other component of the apparatus 1600), process the information (e.g., encode the information for transmission), and send the information to another component (e.g., the transmitter 1614, the communication interface 1602, or some other component) that will transmit the information to another device. In some scenarios (e.g., if the circuit/module for sending 1622 includes a transmitter), the circuit/module for sending 1622 transmits the information directly to another device (e.g., the ultimate destination) via radio frequency signaling or some other type of signaling suitable for the applicable communication medium.

The circuit/module for sending 1622 (e.g., a means for sending) may take various forms. In some aspects, the circuit/module for sending 1622 may correspond to, for example, an interface (e.g., a bus interface, a send/receive interface, or some other type of signal interface), a communication device, a transceiver, a transmitter, or some other similar component as discussed herein. In some implementations, the communication interface 1602 includes the circuit/module for sending 1622 and/or the code for sending 1632. In some implementations, the circuit/module for sending 1622 and/or the code for sending 1632 is configured to control the communication interface 1602 (e.g., a transceiver or a transmitter) to transmit information.

The circuit/module for computing 1624 may include circuitry and/or programming (e.g., code for computing 1634 stored on the storage medium 1604) adapted to perform several functions relating to, for example, computing a value. In some aspects, the circuit/module for computing 1624 (e.g., a means for computing) may correspond to, for example, a processing circuit.

Initially, the circuit/module for computing 1624 may obtain information upon which the computation is to be based. For example, the circuit/module for computing 1624 may obtain information as discussed above in conjunction with FIGS. 8-15 (e.g., from the communication interface 1602, the memory device 1608, or some other component of the apparatus 1600). The circuit/module for computing 1624 may then make the computation based on the obtained information. For example, the circuit/module for computing 1624 may determine a start angle based on at least one of satellite pitch, satellite location, or satellite beam ON and/or OFF time. As another example, the circuit/module for computing 1624 may determine a span based on a satellite beam ON and/or OFF time. The circuit/module for computing 1624 may then output the computed result (e.g., to the circuit/module for sending 1622, the memory device 1608, or some other component).

Figure 17:
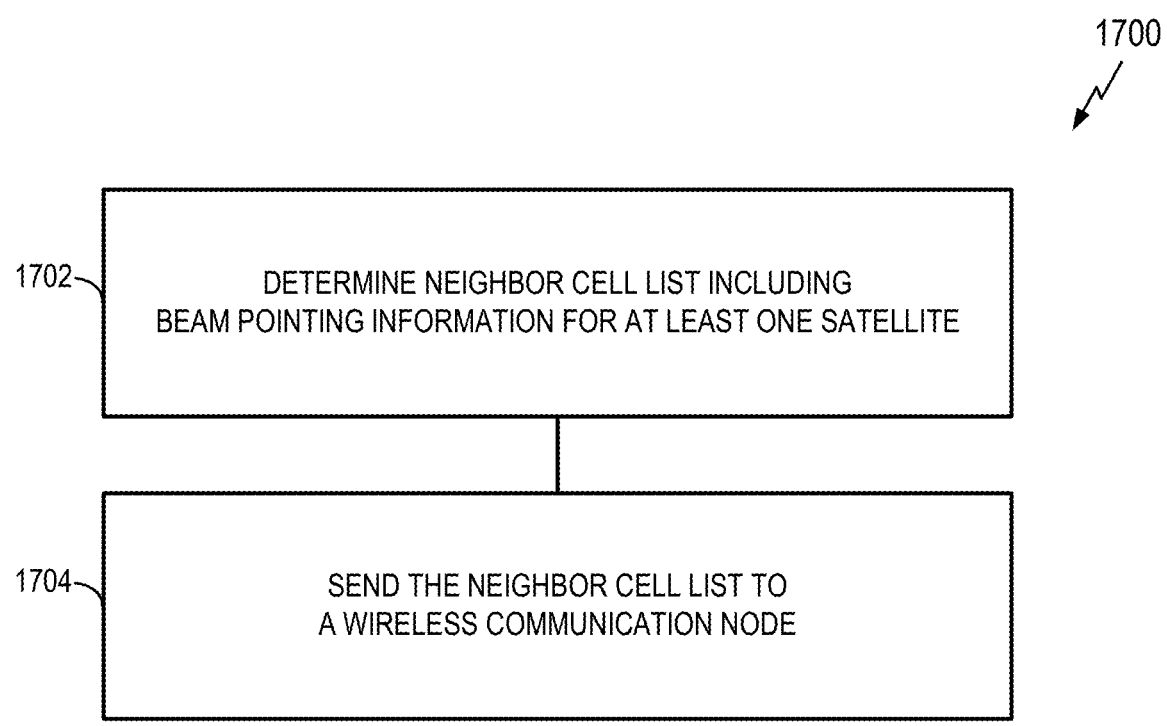
FIG. 17 is a flowchart illustrating an example process for providing a neighbor cell list in accordance with some aspects of the disclosure.
Figure 18:
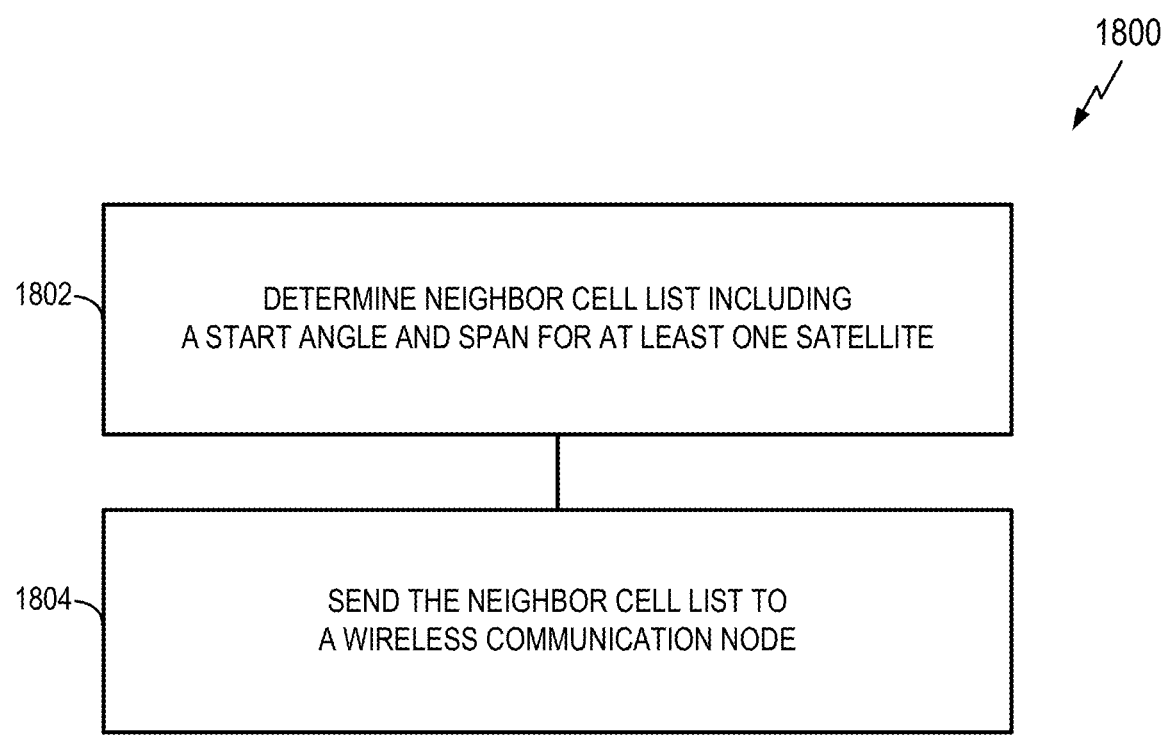
FIG. 18 is a flowchart illustrating another example process for providing a neighbor cell list in accordance with some aspects of the disclosure.
Figure 19:
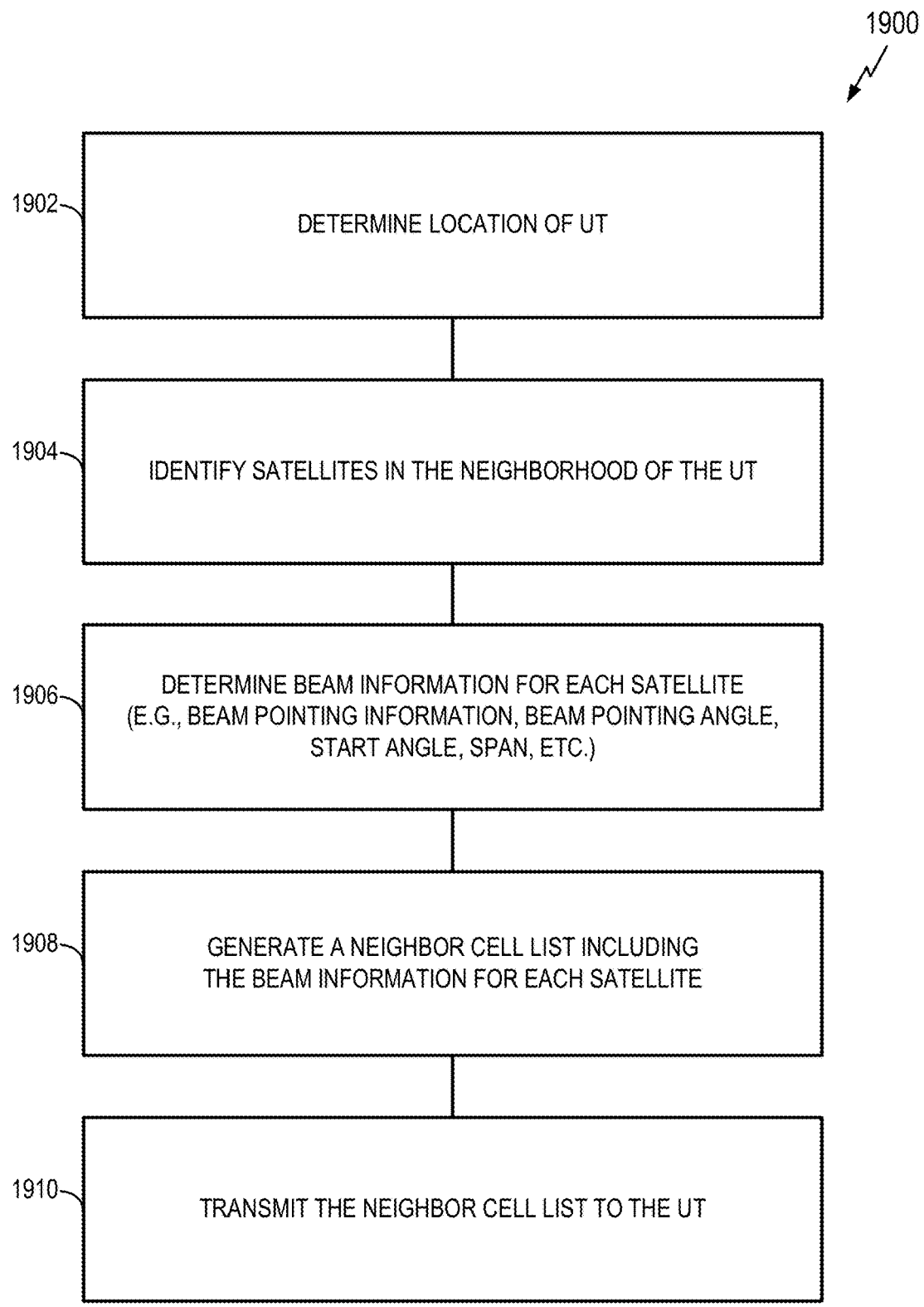
FIG. 19 is a flowchart illustrating another example process for providing a neighbor cell list in accordance with some aspects of the disclosure.

FIGS. 17-19 describe examples of providing a neighbor cell list for an apparatus, where the neighbor cell list includes beam information for at least one satellite. FIG. 17 describes an example where the beam information includes beam pointing information. FIG. 18 describes an example where the beam information includes a start time and a span. FIG. 19 describes a more detailed example. Other types of beam information could be used in other implementations. In some aspects, the angle may be measured in elevation or azimuth.

First Example Process

FIG. 17 illustrates a process 1700 for communication in accordance with some aspects of the disclosure. The process 1700 may take place within a processing circuit (e.g., the processing circuit 1610 of FIG. 16), which may be located in a GN or some other suitable apparatus. In some implementations, the process 1700 may be performed by a GN for at least one non-geosynchronous satellite. Of course, in various aspects within the scope of the disclosure, the process 1700 may be implemented by any suitable apparatus capable of supporting communication-related operations.

At block 1702, an apparatus (e.g., a GN) determines a neighbor cell list (NCL) that includes beam pointing information for at least one satellite. In some aspects, the neighbor cell list may include other beam pointing information for at least one other satellite. For example, the neighbor cell list may include first beam pointing information for a first satellite, second beam pointing information for a second satellite, and so on. In some aspects, the neighbor cell list may include satellite illumination information that includes the beam pointing information. In some aspects, the satellite illumination information may include pitch illumination information and/or roll illumination information. In some aspects, the neighbor cell list may include satellite attitude information.

The beam pointing information may take various forms. In some aspects, the beam pointing information may include an elevation angle, an azimuth angle, or any combination thereof.

In some aspects, the beam pointing information may include at least one beam pointing angle. In some aspects, the at least one beam pointing angle may include at least one elevation angle with reference to a body frame of the at least one satellite. In some aspects, the at least one beam pointing angle may include at least one elevation angle with reference to a direction perpendicular to motion of the at least one satellite. In some aspects, the at least one beam pointing angle may include at least one azimuth angle with reference to a direction perpendicular to motion of the at least one satellite. In some aspects, the at least one beam pointing angle may include at least one azimuth angle with reference to a body frame of the at least one satellite.

In some aspects, the beam pointing information may include attitude information. In some aspects, the attitude information may include pitch, roll, yaw, or any combination thereof. In some aspects, the attitude information may be defined by an equation.

In some aspects, the beam pointing information may include pitch information. In some aspects, the pitch information may include pitches of a satellite beam for at least one of: particular latitudes, particular time instances, particular time periods, or any combination thereof. In some aspects, the pitch information may be defined by an equation. In some aspects, the pitch information may include at least one of: a pitch magnitude, a start pitch, an end pitch, a flip pitch, or any combination thereof.

In some aspects, the beam pointing information may include roll information. In some aspects, the roll information may include roll of a satellite beam for at least one of: particular latitudes, particular time instances, particular time periods, or any combination thereof. In some aspects, the roll information may be defined by an equation. In some aspects, the roll information may include at least one of: a roll magnitude, a start roll, an end roll, a flip roll, or any combination thereof.

In some aspects, the beam pointing information may include yaw information. In some aspects, the yaw information may include yaw of a satellite beam for at least one of: particular latitudes, particular time instances, particular time periods, or any combination thereof. In some aspects, the yaw information may be defined by an equation. In some aspects, the yaw information may include at least one of: a yaw magnitude, a start yaw, an end yaw, a flip yaw, or any combination thereof.

In some implementations, the circuit/module for determining 1620 of FIG. 16 performs the operations of block 1702. In some implementations, the code for receiving 1630 of FIG. 16 is executed to perform the operations of block 1702.

At block 1704, the apparatus sends the neighbor cell list to a wireless communication node. For example, a GN may transmit the neighbor cell list to a UT.

In some implementations, the circuit/module for sending 1622 of FIG. 16 performs the operations of block 1704. In some implementations, the code for sending 1632 of FIG. 16 is executed to perform the operations of block 1704.

In some aspects, an apparatus may perform any of the operation discussed above for FIG. 17, or any combination thereof.

Second Example Process

FIG. 18 illustrates a process 1800 for communication in accordance with some aspects of the disclosure. The process 1800 may take place within a processing circuit (e.g., the processing circuit 1610 of FIG. 16), which may be located in a GN or some other suitable apparatus. In some implementations, the process 1800 may be performed by a GN for at least one non-geosynchronous satellite. Of course, in various aspects within the scope of the disclosure, the process 1800 may be implemented by any suitable apparatus capable of supporting communication-related operations.

At block 1802, an apparatus (e.g., a GN) determines a neighbor cell list (NCL) that includes at least one start angle and span for at least one satellite. In some aspects, the neighbor cell list may include at least one other start angle and span for at least one other satellite. For example, the neighbor cell list may include a first start angle and span for a first satellite, a second start angle and span for a second satellite, and so on. In some aspects, the neighbor cell list may include satellite illumination information that includes the at least one start angle and span. In some aspects, the satellite illumination information may include pitch illumination information and/or roll illumination information. In some aspects, the neighbor cell list may include satellite attitude information.

In some aspects, the at least one start angle and span may be measured in elevation or azimuth. For example, the at least one start angle and span may be for at least one elevation angle. As another example, the at least one start angle and span may be for at least one azimuth angle. Also, the at least one start angle and span may be for at least one yaw angle.

The at least one start angle may be determined (e.g., computed) in various ways. In some aspects, the start angle may be computed based on at least one satellite pitch of the at least one satellite. In some aspects, the start angle may be computed based on at least one satellite location of the at least one satellite. In some aspects, the start angle may be computed based on at least one beam ON time and/or beam OFF time of the at least one satellite.

The at least one span may be determined in various ways. In some aspects, the at least one span may be computed based on at least one beam ON time and/or beam OFF time of the at least one satellite.

In some implementations, the circuit/module for determining 1620 of FIG. 16 performs the operations of block 1802. In some implementations, the code for receiving 1630 of FIG. 16 is executed to perform the operations of block 1802.

At block 1804, the apparatus sends the neighbor cell list to an apparatus. For example, a GN may transmit the neighbor cell list to a UT.

In some implementations, the circuit/module for sending 1622 of FIG. 16 performs the operations of block 1804. In some implementations, the code for sending 1632 of FIG. 16 is executed to perform the operations of block 1804.

In some aspects, an apparatus may perform any of the operation discussed above for FIG. 18, or any combination thereof.

Third Example Process

FIG. 19 illustrates a process 1900 for communication in accordance with some aspects of the disclosure. The process 1900 may take place within a processing circuit (e.g., the processing circuit 1610 of FIG. 16), which may be located in a GN or some other suitable apparatus. In some implementations, the process 1900 may be performed by a GN for at least one non-geosynchronous satellite. Of course, in various aspects within the scope of the disclosure, the process 1900 may be implemented by any suitable apparatus capable of supporting communication-related operations.

At block 1902, an apparatus (e.g., a GN) determines the location of a UT.

At block 1904, the apparatus identifies satellites in the neighborhood of the UT.

At block 1906, the apparatus determines beam information for each satellite. For example, for each satellite, the apparatus may determine beam pointing information, a beam pointing angle, a start angle, a span, or any combination thereof.

At block 1908, the apparatus generates a neighbor cell list including the beam information for each satellite.

At block 1910, the apparatus transmits the neighbor cell list to the UT.

In some aspects, an apparatus may perform any of the operation discussed above for FIG. 19, or any combination thereof. In some implementations, the process 1900 may be performed in addition to (e.g., in conjunction with) or as part of the process 1700 of FIG. 17 or the process 1800 of FIG. 18. For example, blocks 1902-1908 may correspond to block 1702 of FIG. 17 or block 1802 of FIG. 18, while block 1910 may correspond to block 1704 of FIG. 17 or block 1804 of FIG. 18.

Second Example Apparatus

Figure 20:
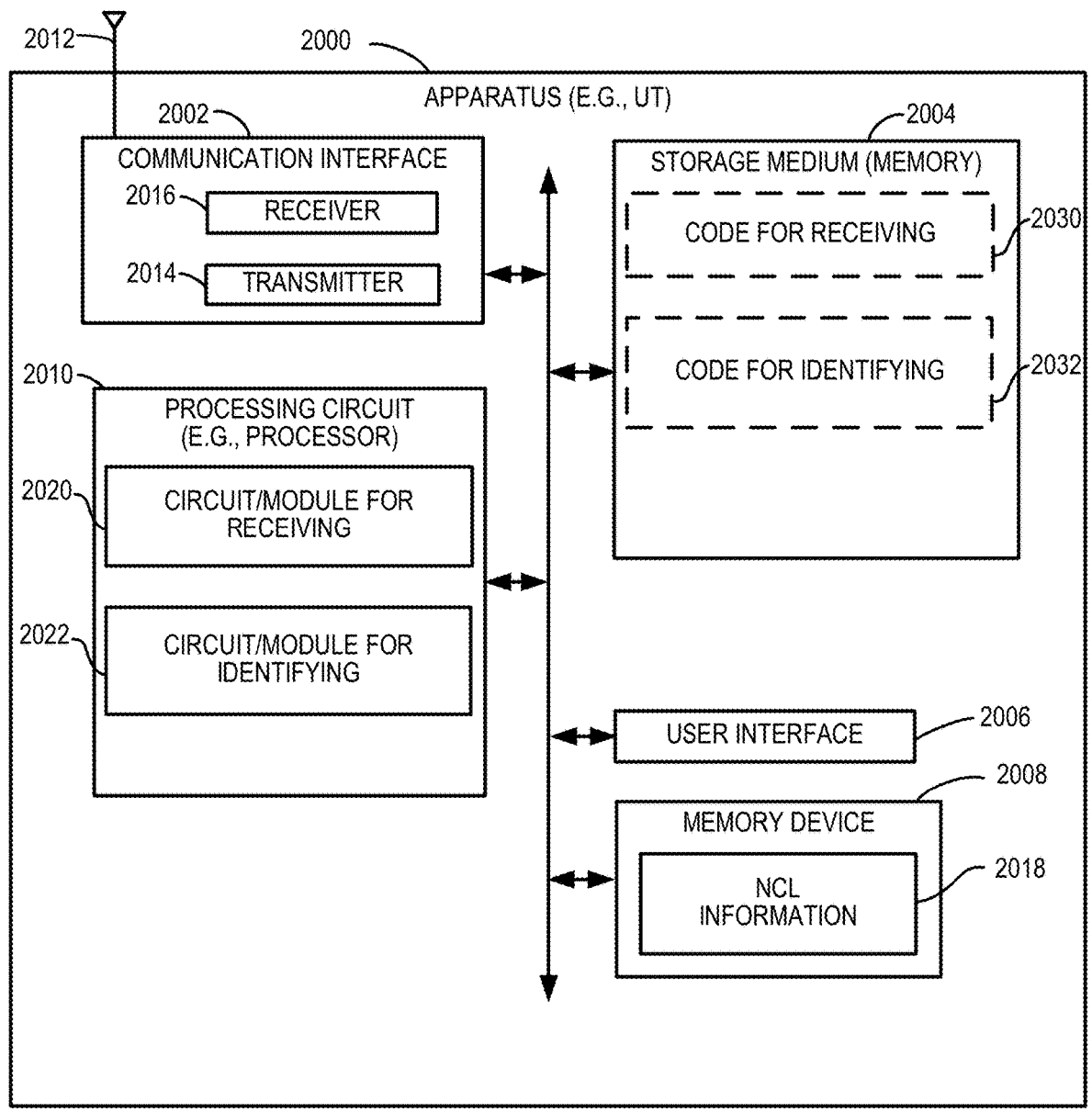
FIG. 20 is a block diagram illustrating another example hardware implementation for an apparatus (e.g., an electronic device) that can support communication of a neighbor cell list in accordance with some aspects of the disclosure.

FIG. 20 illustrates a block diagram of an example hardware implementation of another apparatus 2000 configured to communicate according to one or more aspects of the disclosure. For example, the apparatus 2000 could embody or be implemented within a UT or some other type of device that supports satellite communication. In various implementations, the apparatus 2000 could embody or be implemented within a vehicular component, or any other electronic device having circuitry.

The apparatus 2000 includes a communication interface (e.g., at least one transceiver) 2002, a storage medium 2004, a user interface 2006, a memory device 2008 (e.g., storing NCL information 2018), and a processing circuit (e.g., at least one processor) 2010. In various implementations, the user interface 2006 may include one or more of: a keypad, a display, a speaker, a microphone, a touchscreen display, of some other circuitry for receiving an input from or sending an output to a user. The communication interface 2002 may be coupled to one or more antennas 2012, and may include a transmitter 2014 and a receiver 2016. In general, the components of FIG. 20 may be similar to corresponding components of the apparatus 1600 of FIG. 16.

According to one or more aspects of the disclosure, the processing circuit 2010 may be adapted to perform any or all of the features, processes, functions, operations and/or routines for any or all of the apparatuses described herein. For example, the processing circuit 2010 may be configured to perform any of the steps, functions, and/or processes described with respect to FIGS. 1-15 and 21-23. As used herein, the term "adapted" in relation to the processing circuit 2010 may refer to the processing circuit 2010 being one or more of configured, used, implemented, and/or programmed to perform a particular process, function, operation and/or routine according to various features described herein.

The processing circuit 2010 may be a specialized processor, such as an application-specific integrated circuit (ASIC) that serves as a means for (e.g., structure for) carrying out any one of the operations described in conjunction with FIGS. 1-15 and 21-23. The processing circuit 2010 serves as one example of a means for transmitting and/or a means for receiving. In various implementations, the processing circuit 2010 may provide and/or incorporate, at least in part, the functionality described above for the functionality of the GN controller 250 of FIG. 2.

According to at least one example of the apparatus 2000, the processing circuit 2010 may include one or more of a circuit/module for receiving 2020 or a circuit/module for identifying 2022. In various implementations, the circuit/module for receiving 2020 or the circuit/module for identifying 2022 may provide and/or incorporate, at least in part, the functionality described above for the functionality of the GN controller 250 of FIG. 2.

As mentioned above, programming stored by the storage medium 2004, when executed by the processing circuit 2010, causes the processing circuit 2010 to perform one or more of the various functions and/or process operations described herein. For example, the programming may cause the processing circuit 2010 to perform the various functions, steps, and/or processes described herein with respect to FIGS. 1-15 and 21-23 in various implementations. As shown in FIG. 20, the storage medium 2004 may include one or more of code for receiving 2030 or code for identifying 2032. In various implementations, the code for receiving 2030 or the code for identifying 2032 may be executed or otherwise used to provide the functionality described herein for the circuit/module for receiving 2020 or the circuit/module for identifying 2022.

The circuit/module for receiving 2020 may include circuitry and/or programming (e.g., code for receiving 2030 stored on the storage medium 2004) adapted to perform several functions relating to, for example, receiving information. In some scenarios, the circuit/module for receiving 2020 may obtain information (e.g., from the communication interface 2002, the memory device, or some other component of the apparatus 2000) and process (e.g., decode) the information. In some scenarios (e.g., if the circuit/module for receiving 2020 is or includes an RF receiver), the circuit/module for receiving 2020 may receive information directly from a device that transmitted the information. In either case, the circuit/module for receiving 2020 may output the obtained information to another component of the apparatus 2000 (e.g., the circuit/module for identifying 2022, the memory device 2008, or some other component).

The circuit/module for receiving 2020 (e.g., a means for receiving) may take various forms. In some aspects, the circuit/module for receiving 2020 may correspond to, for example, an interface (e.g., a bus interface, a send/receive interface, or some other type of signal interface), a communication device, a transceiver, a receiver, or some other similar component as discussed herein. In some implementations, the communication interface 2002 includes the circuit/module for receiving 2020 and/or the code for receiving 2030. In some implementations, the circuit/module for receiving 2020 and/or the code for receiving 2030 is configured to control the communication interface 2002 (e.g., a transceiver or a receiver) to receive information.

In some scenarios, the received information may include a neighbor cell list. In some aspects, the neighbor cell list may include at least one start angle and span for at least one satellite. In some aspects, the neighbor cell list may include beam pointing information for at least one satellite.

The circuit/module for identifying 2022 may include circuitry and/or programming (e.g., code for identifying 2032 stored on the storage medium 2004) adapted to perform several functions relating to, for example identifying information. In some aspects, the circuit/module for identifying 2022 (e.g., a means for identifying) may correspond to, for example, a processing circuit.

In some aspects, the circuit/module for identifying 2022 may identify a target beam based on a neighbor cell list. Initially, the circuit/module for identifying 2022 may obtain neighbor cell list information (e.g., from the circuit/module for receiving 2020, the memory device 2008, or some other component). Next, the circuit/module for identifying 2022 determines which beam(s) of which satellite(s) may provide service for the apparatus 2000. In some aspects, the circuit/ module for identifying 2022 may perform one or more of the operations described above in conjunction with FIGS. 12-15 to identify a target beam. The circuit/module for identifying 2022 may then output the identified information (e.g., to the communication interface 2002, the memory device 2008 or some other component).

Figure 21:
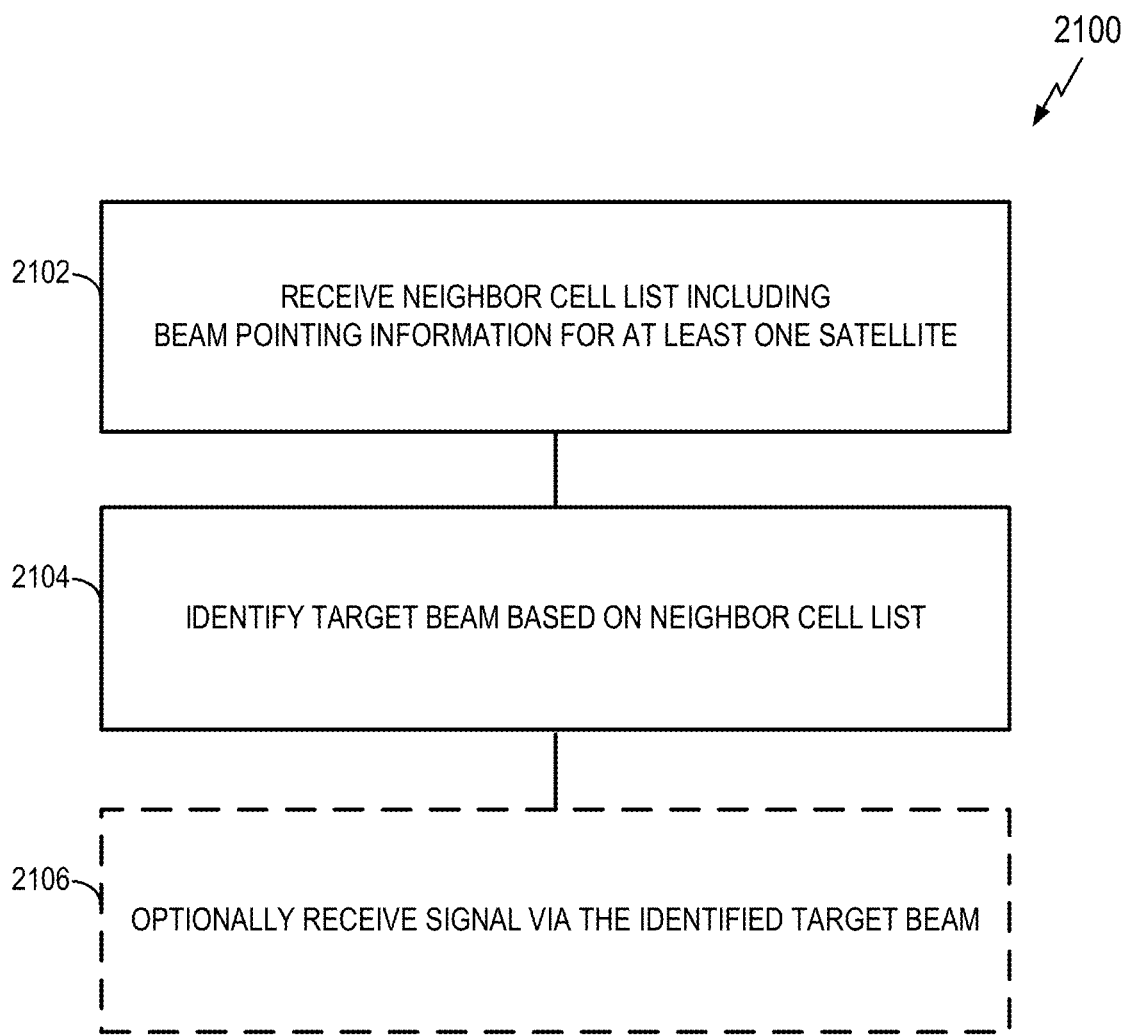
FIG. 21 is a flowchart illustrating an example process for identifying a beam in accordance with some aspects of the disclosure.
Figure 22:
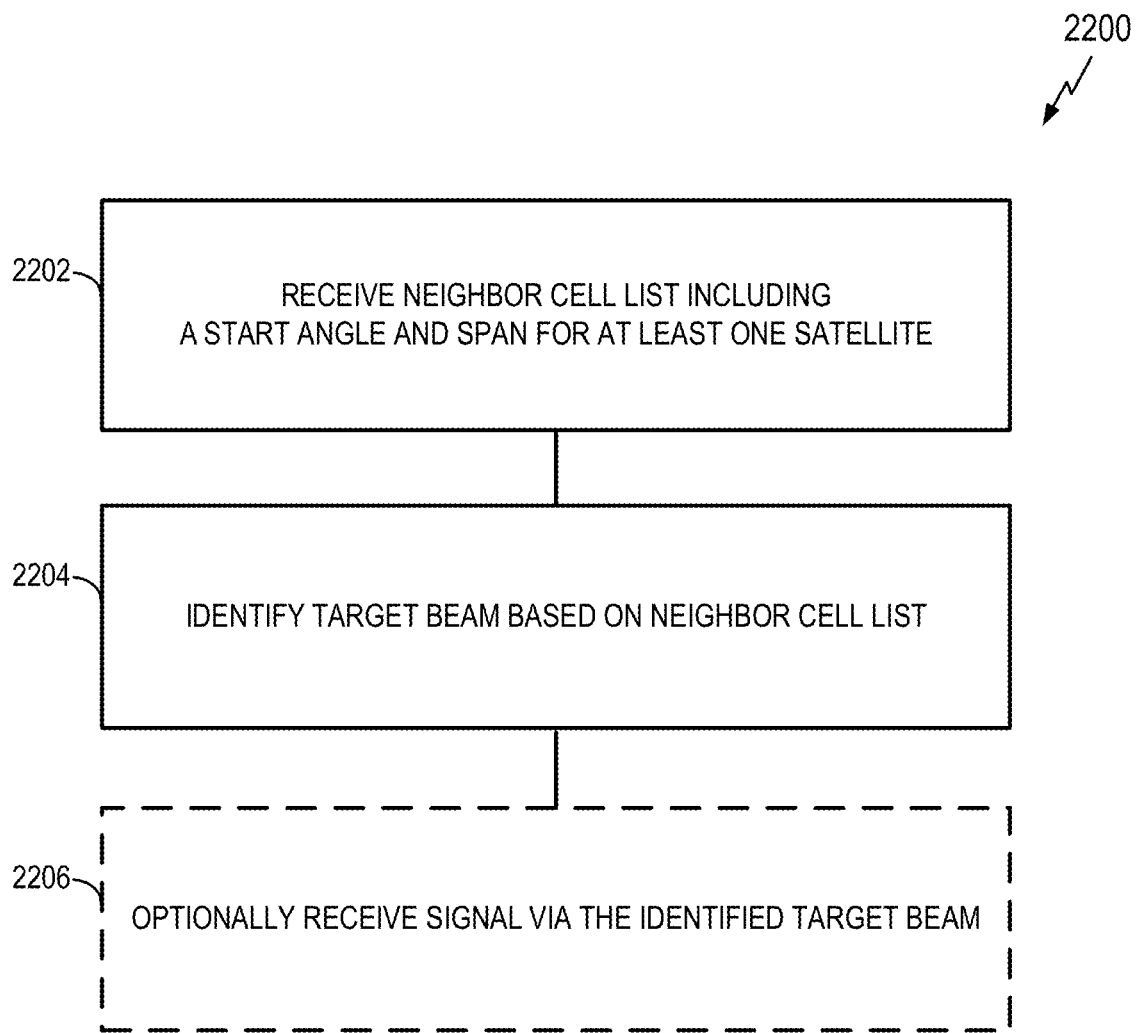
FIG. 22 is a flowchart illustrating another example process for identifying a beam in accordance with some aspects of the disclosure.
Figure 23:
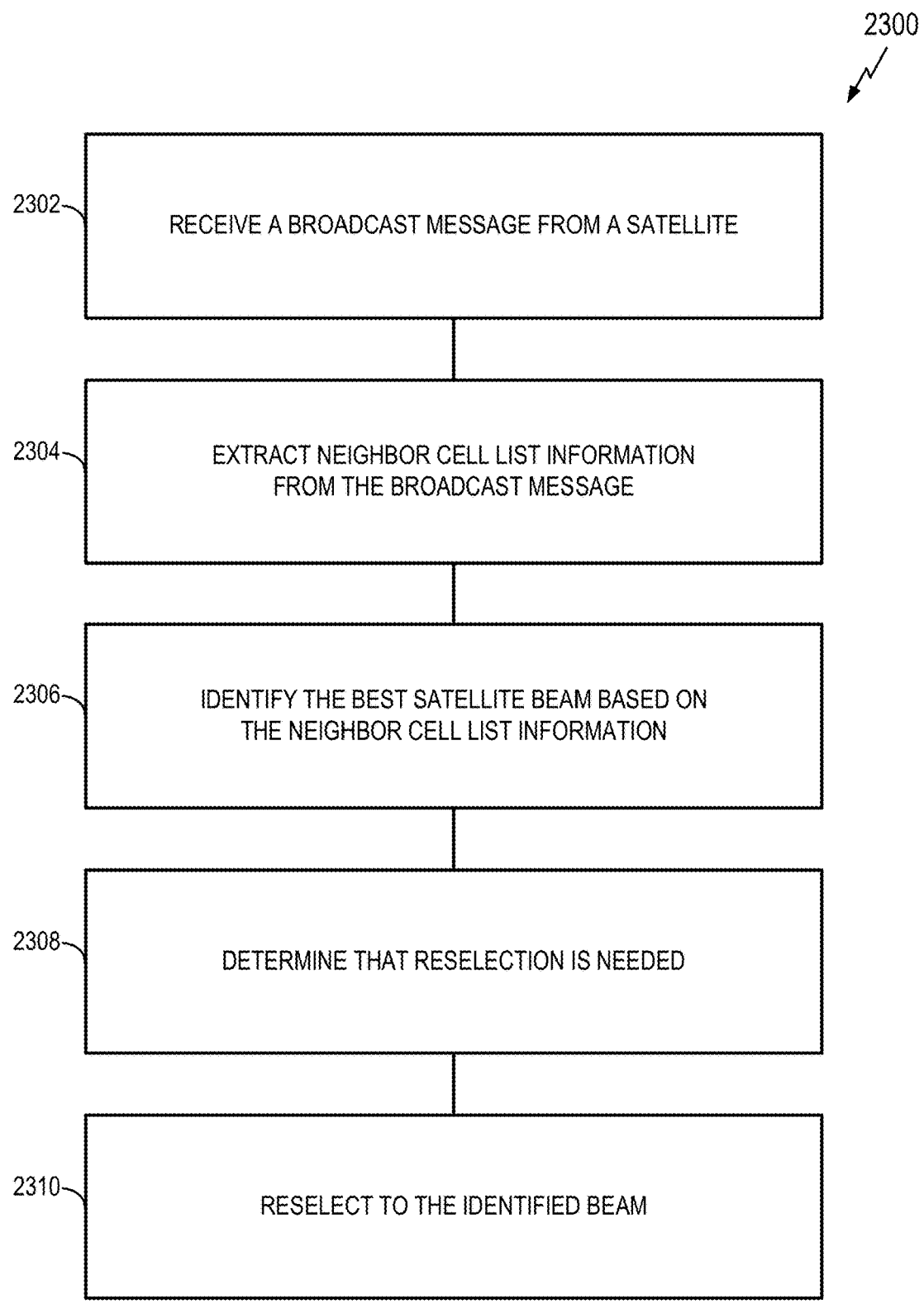
FIG. 23 is a flowchart illustrating an example process for reselecting to a beam in accordance with some aspects of the disclosure.

FIGS. 21-23 describe examples of obtaining a neighbor cell list from an apparatus, where the neighbor cell list includes beam information for at least one satellite. FIG. 21 describes an example where the beam information includes beam pointing information. FIG. 22 describes an example where the beam information includes a start time and a span. FIG. 23 describes an example use of the beam information for idle mode reselection. Other types of beam information could be used in other implementations. In some aspects, the angle may be measured in elevation or azimuth.

Fourth Example Process

FIG. 21 illustrates a process 2100 for communication in accordance with some aspects of the disclosure. The process 2100 may take place within a processing circuit (e.g., the processing circuit 2010 of FIG. 20), which may be located in a UT or some other suitable apparatus. Of course, in various aspects within the scope of the disclosure, the process 2100 may be implemented by any suitable apparatus capable of supporting communication-related operations.

At block 2102, an apparatus (e.g., a UT) receives a neighbor cell list (NCL) that includes beam pointing information for at least one satellite. For example, a UT may receive the neighbor cell list from a GN.

In some aspects, the neighbor cell list may include other beam pointing information for at least one other satellite. For example, the neighbor cell list may include first beam pointing information for a first satellite, second beam pointing information for a second satellite, and so on. In some aspects, the neighbor cell list may include satellite illumination information (e.g., used to identify a satellite illumination region) that includes the beam pointing information. In some aspects, the satellite illumination information may include pitch illumination information and/or roll illumination information. In some aspects, the neighbor cell list may include satellite attitude information.

The beam pointing information may take various forms. In some aspects, the beam pointing information may include an elevation angle, an azimuth angle, or any combination thereof.

In some aspects, the beam pointing information may include at least one beam pointing angle. In some aspects, the at least one beam pointing angle may include at least one elevation angle with reference to a body frame of the at least one satellite. In some aspects, the at least one beam pointing angle may include at least one elevation angle with reference to a direction perpendicular to motion of the at least one satellite. In some aspects, the at least one beam pointing angle may include at least one azimuth angle with reference to a direction perpendicular to motion of the at least one satellite. In some aspects, the at least one beam pointing angle may include at least one azimuth angle with reference to a body frame of the at least one satellite.

In some aspects, the beam pointing information may include attitude information. In some aspects, the attitude information may include pitch, roll, yaw, or any combination thereof. In some aspects, the attitude information may be defined by an equation.

In some aspects, the beam pointing information may include pitch information. In some aspects, the pitch information may include pitches of a satellite beam for at least one of: particular latitudes, particular time instances, particular time periods, or any combination thereof. In some aspects, the pitch information may be defined by an equation. In some aspects, the pitch information may include at least one of: a pitch magnitude, a start pitch, an end pitch, a flip pitch, or any combination thereof.

In some aspects, the beam pointing information may include roll information. In some aspects, the roll information may include roll of a satellite beam for at least one of: particular latitudes, particular time instances, particular time periods, or any combination thereof. In some aspects, the roll information may be defined by an equation. In some aspects, the roll information may include at least one of: a roll magnitude, a start roll, an end roll, a flip roll, or any combination thereof.

In some aspects, the beam pointing information may include yaw information. In some aspects, the yaw information may include yaw of a satellite beam for at least one of: particular latitudes, particular time instances, particular time periods, or any combination thereof. In some aspects, the yaw information may be defined by an equation. In some aspects, the yaw information may include at least one of: a yaw magnitude, a start yaw, an end yaw, a flip yaw, or any combination thereof.

In some implementations, the circuit/module for receiving 2020 of FIG. 20 performs the operations of block 2102. In some implementations, the code for receiving 2030 of FIG. 20 is executed to perform the operations of block 2102.

At block 2104, the apparatus identifies a target beam based on the neighbor cell list. For example, a UT may select the beam with the highest dot product on the nearest plane, or the second nearest plane, etc., as discussed above. In some aspects, the identification of the target beam may include: identifying a set of satellites for which satellite attitude and illumination information is available at a UT; and identifying a satellite of the set of satellites that provides coverage for the UT.

In some implementations, the circuit/module for identifying 2022 of FIG. 20 performs the operations of block 2104. In some implementations, the code for identifying 2032 of FIG. 20 is executed to perform the operations of block 2104.

At optional block 2106, the apparatus may receive a signal via the target beam identified at block 2104. In some implementations, the circuit/module for receiving 2020 of FIG. 20 performs the operations of block 2106. In some implementations, the code for receiving 2030 of FIG. 20 is executed to perform the operations of block 2106.

In some aspects, an apparatus may perform any of the operation discussed above for FIG. 21, or any combination thereof.

Fifth Example Process

FIG. 22 illustrates a process 2200 for communication in accordance with some aspects of the disclosure. The process 2200 may take place within a processing circuit (e.g., the processing circuit 2010 of FIG. 20), which may be located in a UT or some other suitable apparatus. Of course, in various aspects within the scope of the disclosure, the process 2200 may be implemented by any suitable apparatus capable of supporting communication-related operations.

At block 2202, an apparatus (e.g., a UT) receives a neighbor cell list (NCL) that includes a start angle and span for at least one satellite. For example, a UT may receive the neighbor cell list from a GN. In some aspects, the neighbor cell list may include satellite illumination information (e.g., used to identify a satellite illumination region) that includes the at least one start angle and span. In some aspects, the satellite illumination information may include pitch illumination information and/or roll illumination information. In some aspects, the neighbor cell list may include satellite attitude information.

In some aspects, the at least one start angle and span may be measured in elevation or azimuth. For example, the at least one start angle and span may be for at least one elevation angle. As another example, the at least one start angle and span may be for at least one azimuth angle. Also, the at least one start angle and span may be for at least one yaw angle.

In some implementations, the circuit/module for receiving 2020 of FIG. 20 performs the operations of block 2202. In some implementations, the code for receiving 2030 of FIG. 20 is executed to perform the operations of block 2202.

At block 2204, the apparatus identifies a target beam based on the neighbor cell list. For example, a UT may sort the satellites by distance and select the nearest satellite for which Δel (and, optionally, Δaz) is within the range defined in the neighbor cell list as discussed above. In some aspects, the identification of the target beam may include searching for at least one cell associated with the at least one satellite. In some aspects, the identification of the target beam may include: identifying a set of satellites for which satellite attitude and illumination information is available at a UT; and identifying a satellite of the set of satellites that provides coverage for the UT.

In some implementations, the circuit/module for identifying 2022 of FIG. 20 performs the operations of block 2204. In some implementations, the code for identifying 2032 of FIG. 20 is executed to perform the operations of block 2204.

At optional block 2206, the apparatus may receive a signal via the target beam identified at block 2204. In some implementations, the circuit/module for receiving 2020 of FIG. 20 performs the operations of block 2206. In some implementations, the code for receiving 2030 of FIG. 20 is executed to perform the operations of block 2206.

In some aspects, an apparatus may perform any of the operation discussed above for FIG. 22, or any combination thereof.

Sixth Example Process

FIG. 23 illustrates a process 2300 for communication in accordance with some aspects of the disclosure. The process 2300 may take place within a processing circuit (e.g., the processing circuit 2010 of FIG. 20), which may be located in a UT or some other suitable apparatus. Of course, in various aspects within the scope of the disclosure, the process 2300 may be implemented by any suitable apparatus capable of supporting communication-related operations.

At block 2302, an apparatus (e.g., a UT) receives a broadcast message from a satellite. For example, the broadcast message may take the form of a broadcast information block.

At block 2304, the apparatus extracts neighbor cell list information from the broadcast message. For example, the neighbor cell list information may include a Satellite Identity, a Satellite Reference Time, an Attitude Profile, and Beam List Information. As another example, the neighbor cell list information may include a Satellite Identity, an Entry Valid Time, a Delta Elevation Angle, a Delta Azimuth Angle, and a Delta Yaw Angle.

At block 2306, the apparatus identifies the best beam (e.g., for reselection) based on the neighbor cell list information. For example, the apparatus may perform the beam selection algorithm described above in conjunction with FIG. 12. As another example, the apparatus may perform the satellite selection algorithm described above in conjunction with FIG. 14.

At block 2308, the apparatus determines that reselection is needed. For example, the apparatus may subsequently be within the coverage area of a different satellite.

At block 2310, the apparatus reselects to the beam identified at block 2306.

In some aspects, an apparatus may perform any of the operation discussed above for FIG. 23, or any combination thereof. In some implementations, the process 2300 may be performed in addition to (e.g., in conjunction with) or as part of the process 2100 of FIG. 21 or the process 2200 of FIG. 22. For example, blocks 2302 and 2304 may correspond to block 2102 of FIG. 21 or block 2202 of FIG. 22, while block 2306 may correspond to block 2104 of FIG. 21 or block 2204 of FIG. 22.

Seventh Example Process

Figure 24:
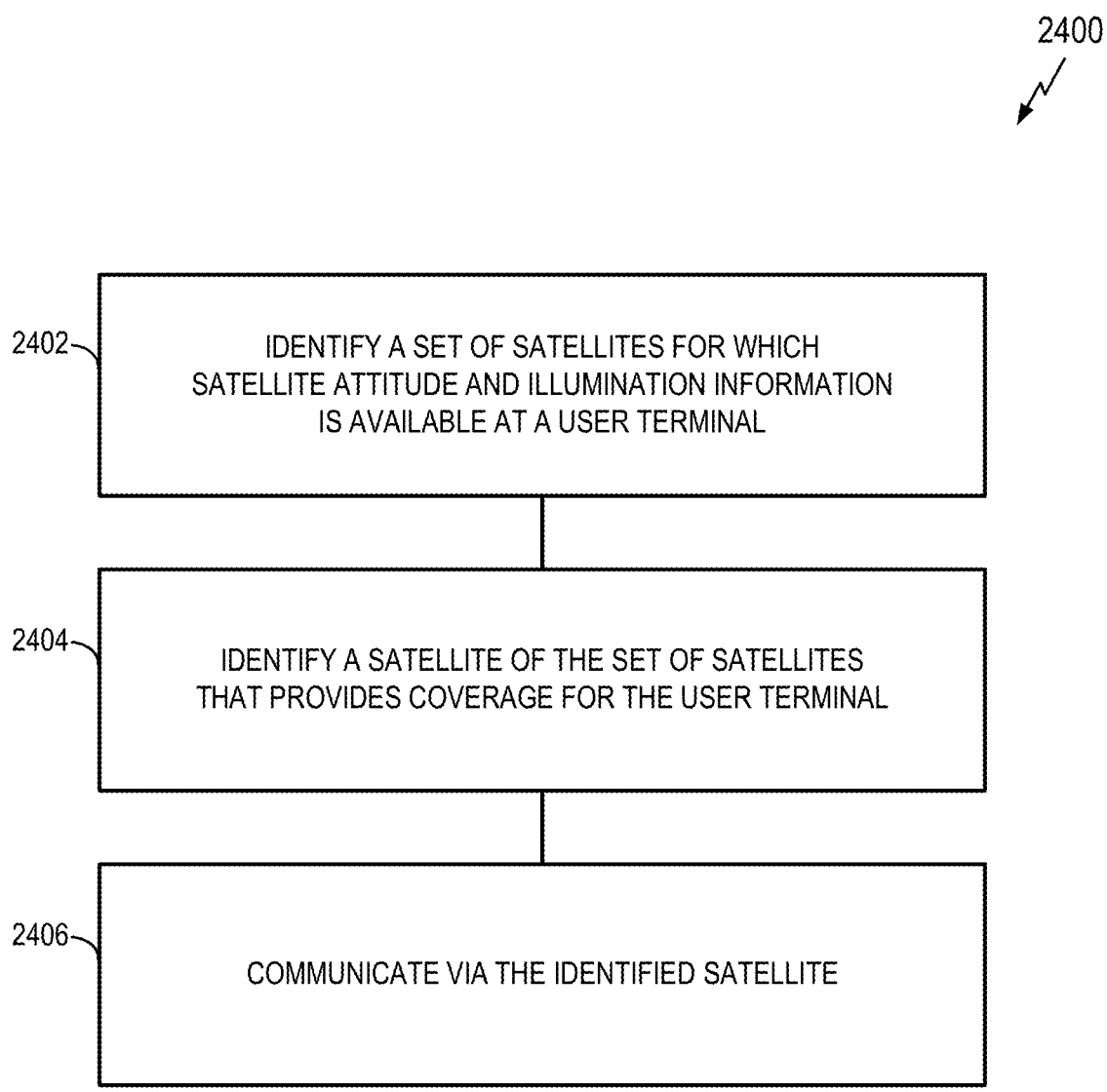
FIG. 24 is a flowchart illustrating an example process for using satellite attitude and illumination information in accordance with some aspects of the disclosure.

FIG. 24 illustrates a process 2400 for communication in accordance with some aspects of the disclosure. The process 2400 may take place within a processing circuit (e.g., the processing circuit 2010 of FIG. 20), which may be located in a UT or some other suitable apparatus. Of course, in various aspects within the scope of the disclosure, the process 2400 may be implemented by any suitable apparatus capable of supporting communication-related operations.

At block 2402, an apparatus (e.g., a UT) identifies a set of satellites for which satellite attitude and illumination information is available at a user terminal. In some aspects, the identification of the set of satellites may include identifying at least one first satellite that is at a location to which the user terminal is able to point an antenna.

At block 2404, the apparatus identifies a satellite of the set of satellites that provides coverage for the user terminal. In some aspects, the identification of the satellite that provides coverage for the user terminal may include identifying at least one second satellite of the identified at least one first satellite that can currently provide coverage for the user terminal. In some aspects, the identification of the satellite that provides coverage for the user terminal may include: identifying a plurality of satellites of the set that can currently provide coverage for the user terminal; identifying a plurality of orbital planes upon which the plurality of satellites lie; identifying an orbital plane of the plurality of orbital planes that is closest to the user terminal; and identifying one satellite of any satellites on the identified orbital plane that is closest to the user terminal.

At block 2406, the apparatus communicates via the identified satellite.

In some aspects, an apparatus may perform any of the operation discussed above for FIG. 24, or any combination thereof. In some implementations, the process 2400 may be performed in addition to (e.g., in conjunction with) or as part of the process 2100 of FIG. 21 or the process 2200 of FIG. 22. For example, blocks 2402 and 2404 may correspond to block 2104 of FIG. 21 or block 2204 of FIG. 22, while block 2406 may correspond to block 2106 of FIG. 21 or block 2206 of FIG. 22.

Additional Aspects

The disclosure relates in some aspects to determining a neighbor cell list that includes a start angle and span for at least one satellite; and sending the neighbor cell list to an apparatus. In some aspects, the angle may be measured in elevation or azimuth. In some aspects, the neighbor cell list may further include at least one other start angle and span for at least one other satellite. In some aspects, the wireless communication node may include a user terminal. In some aspects, the at least one start angle and span may be for at least one elevation angle. In some aspects, the at least one start angle and span may be for at least one azimuth angle. In some aspects, the at least one start angle and span may be for at least one yaw angle. In some aspects, the determination of the neighbor cell list may include: computing the at least one start angle based on at least one of: at least one satellite pitch of the at least one satellite, at least one satellite location of the at least one satellite, at least one beam ON/OFF time of the at least one satellite, or any combination thereof. In some aspects, the determination of the neighbor cell list may include: computing the at least one span based on at least one beam ON/OFF time of the at least one satellite.

The disclosure relates in some aspects to receiving a neighbor cell list that includes a start angle and span for at least one satellite; and identifying a target beam based on the neighbor cell list. In some aspects, a signal may be received via the identified target beam. In some aspects, the angle may be measured in elevation or azimuth. In some aspects, the neighbor cell list may further include at least one other start angle and span for at least one other satellite. In some aspects, the at least one start angle and span may be for at least one elevation angle. In some aspects, the at least one start angle and span may be for at least one azimuth angle. In some aspects, the at least one start angle and span may be for at least one yaw angle. In some aspects, the identification of the target beam may include searching for at least one cell associated with the at least one satellite.

The disclosure relates in some aspects to determining a neighbor cell list that includes beam pointing information for at least one satellite; and sending the neighbor cell list to an apparatus. The disclosure relates in some aspects to receiving a neighbor cell list that includes beam pointing information for at least one satellite; and identifying a target beam based on the neighbor cell list. In some aspects, a signal may be received via the identified target beam. In some aspects, these aspects may be performed by a user terminal. In some aspects, the neighbor cell list may further include other beam pointing information for at least one other satellite.

In some aspects, the beam pointing information may include at least one beam pointing angle. In some aspects, the at least one beam pointing angle may include at least one elevation angle with reference to a body frame of the at least one satellite. In some aspects, the at least one beam pointing angle may include at least one elevation angle with reference to a direction perpendicular to motion of the at least one satellite. In some aspects, the at least one beam pointing angle may include at least one azimuth angle with reference to a direction perpendicular to motion of the at least one satellite. In some aspects, the at least one beam pointing angle may include at least one azimuth angle with reference to a body frame of the at least one satellite. In some aspects, the beam pointing information may include an elevation angle, an azimuth angle or any combination thereof. In some aspects, the beam pointing information may include attitude information, pitch information, roll information, yaw information, or any combination thereof. In some aspects, the attitude information may include pitch, roll, yaw, or any combination thereof. In some aspects, the pitch information may include pitches of a satellite beam for at least one of: particular latitudes, particular time instances, particular time periods, or any combination thereof. In some aspects, the pitch information may include at least one of: a pitch magnitude, a start pitch, an end pitch, a flip pitch, or any combination thereof. In some aspects, the roll information may include roll of a satellite beam for at least one of: particular latitudes, particular time instances, particular time periods, or any combination thereof. In some aspects, the roll information may include at least one of: a roll magnitude, a start roll, an end roll, a flip roll, or any combination thereof. In some aspects, the yaw information may include yaw of a satellite beam for at least one of: particular latitudes, particular time instances, particular time periods, or any combination thereof. In some aspects, the yaw information may include at least one of: a yaw magnitude, a start yaw, an end yaw, a flip yaw, or any combination thereof.

Other Aspects

The examples set forth herein are provided to illustrate certain concepts of the disclosure. Those of ordinary skill in the art will comprehend that these are merely illustrative in nature, and other examples may fall within the scope of the disclosure and the appended claims. Based on the teachings herein those skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein.

As those skilled in the art will readily appreciate, various aspects described throughout this disclosure may be extended to any suitable telecommunication system, network architecture, and communication standard. By way of example, various aspects may be applied to wide area networks, peer-to-peer network, local area network, other suitable systems, or any combination thereof, including those described by yet-to-be defined standards.

Many aspects are described in terms of sequences of actions to be performed by, for example, elements of a computing device. It will be recognized that various actions described herein can be performed by specific circuits, for example, central processing units (CPUs), graphic processing units (GPUs), digital signal processors (DSPs), application specific integrated circuits (ASICs), field programmable gate arrays (FPGAs), or various other types of general purpose or special purpose processors or circuits, by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the disclosure.

One or more of the components, steps, features and/or functions illustrated in above may be rearranged and/or combined into a single component, step, feature or function or embodied in several components, steps, or functions. Additional elements, components, steps, and/or functions may also be added without departing from novel features disclosed herein. The apparatus, devices, and/or components illustrated above may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The methods, sequences or algorithms described in connection with the aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An example of a storage medium is coupled to the processor such that the processor can read information from, and write information to, the storage medium. In the alternative, the storage medium may be integral to the processor.

The word "exemplary" is used herein to mean "serving as an example, instance, or illustration." Any aspect described herein as "exemplary" is not necessarily to be construed as preferred or advantageous over other aspects. Likewise, the term "aspects" does not require that all aspects include the discussed feature, advantage or mode of operation.

The terminology used herein is for the purpose of describing particular aspects only and is not intended to be limiting of the aspects. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, steps, operations, elements, or components, but do not preclude the presence or addition of one or more other features, integers, steps, operations, elements, components, or groups thereof. Moreover, it is understood that the word "or" has the same meaning as the Boolean operator "OR," that is, it encompasses the possibilities of "either" and "both" and is not limited to "exclusive or" ("XOR"), unless expressly stated otherwise. It is also understood that the symbol "/" between two adjacent words has the same meaning as "or" unless expressly stated otherwise. Moreover, phrases such as "connected to," "coupled to" or "in communication with" are not limited to direct connections unless expressly stated otherwise.

Any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be used there or that the first element must precede the second element in some manner. Also, unless stated otherwise a set of elements may comprise one or more elements. In addition, terminology of the form "at least one of a, b, or c" or "a, b, c, or any combination thereof" used in the description or the claims means "a or b or c or any combination of these elements." For example, this terminology may include a, or b, or c, or a and b, or a and c, or a and b and c, or 2a, or 2b, or 2c, or 2a and b, and so on.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

While the foregoing disclosure shows illustrative aspects, it should be noted that various changes and modifications could be made herein without departing from the scope of the appended claims. The functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated.

The invention claimed is:

1. A method of communication, comprising:
by a ground network of a satellite communication system, determining a neighbor cell list that identifies a plurality of cells that are candidates for cell reselection for at least one user terminal that is under a footprint of a first beam of a first satellite of a plurality of satellites, wherein the neighbor cell list comprises a first ON duration of a first cell of the plurality of cells and a second ON duration of a second cell of the plurality of cells, wherein the first ON duration indicates a first time that a second satellite of the plurality of satellites turns on a second beam and a second time that the second satellite turns off the second beam, and wherein the second ON duration indicates a third time that a third satellite of the plurality of satellites turns on a third beam and a fourth time that the third satellite turns off the third beam; and by the ground network of the satellite communication system, via at least one wireless satellite link, sending a broadcast information block (BIB) message comprising the neighbor cell list to a first user terminal of the at least one user terminal, wherein the BIB message comprises a quantity of segments, each segment comprising a corresponding portion of the neighbor cell list and a corresponding sequence number relating to the corresponding portion of the neighbor cell list.

2. The method of claim 1, wherein the neighbor cell list includes at least one start angle and span for the plurality of satellites.

3. The method of claim 2, wherein the at least one start angle and span is for at least one elevation angle.

4. The method of claim 2, wherein the at least one start angle and span is for at least one azimuth angle.

5. The method of claim 2, wherein the at least one start angle and span is for at least one yaw angle.

6. The method of claim 2, wherein the determination of the neighbor cell list comprises:
computing one or more start angles of the at least one start angle and span based on at least one of: at least one satellite pitch of the second satellite or the third satellite, at least one satellite location of the second satellite or the third satellite, at least one beam ON/OFF time of the second satellite or the third satellite, or any combination thereof.

7. The method of claim 2, wherein the determination of the neighbor cell list comprises:
computing one or more spans of the at least one start angle and span based on at least one beam ON/OFF time of the second satellite or the third satellite.

8. An apparatus for communication comprising:
a memory; and
a processor coupled to the memory,
the processor and the memory configured to:
determine, by a ground network of a satellite communication system, a neighbor cell list that identifies a plurality of cells that are candidates for cell reselection for at least one user terminal that is under a footprint of a first beam of a first satellite of a plurality of satellites, wherein the neighbor cell list comprises a first ON duration of a first cell of the plurality of cells and a second ON duration of a second cell of the plurality of cells, wherein the first ON duration indicates a first time that a second satellite of the plurality of satellites turns on a second beam and a second time that the second satellite turns off the second beam, and wherein the second ON duration indicates a third time that a third satellite of the plurality of satellites turns on a third beam and a fourth time that the third satellite turns off the third beam; and
send, by the ground network of the satellite communication system via at least one wireless satellite link, a broadcast information block (BIB) message comprising the neighbor cell list to a first user terminal of the at least one user terminal, wherein the BIB message comprises a quantity of segments, each segment comprising a corresponding portion of the neighbor cell list and a corresponding sequence number relating to the corresponding portion of the neighbor cell list.

9. The apparatus of claim 8, wherein:
the neighbor cell list includes at least one start angle and span for the plurality of satellites; and the at least one start angle and span is for at least one of: an elevation angle, an azimuth angle, a yaw angle, or any combination thereof.

10. The apparatus of claim 9, wherein the processor and the memory are further configured to:
compute one or more start angles of the at least one start angle and span based on at least one of: at least one satellite pitch of the second satellite or the third satellite, at least one satellite location of the second satellite or the third satellite, at least one beam ON/OFF time of the second satellite or the third satellite, or any combination thereof.

11. The apparatus of claim 9, wherein the processor and the memory are further configured to:
compute one or more spans of the at least one start angle and span based on at least one beam ON/OFF time of the second satellite or the third satellite.

12. A method of communication, comprising:
by a first user terminal, receiving, from a ground network of a satellite communication system via at least one wireless satellite link, a broadcast information block (BIB) message comprising a neighbor cell list, wherein the BIB message comprises a quantity of segments, each segment comprising a corresponding portion of the neighbor cell list and a corresponding sequence number relating to the corresponding portion of the neighbor cell list, wherein the neighbor cell list that identifies a plurality of cells are candidates for cell reselection for at least one user terminal including the first user terminal that is under a footprint of a first beam of a first satellite of a plurality of satellites, wherein the neighbor cell list comprises a first ON duration of a first cell of the plurality of cells and a second ON duration of a second cell of the plurality of cells, wherein the first ON duration indicates a first time that a second satellite of the plurality of satellites turns on a second beam and a second time that the second satellite turns off the second beam, and wherein the second ON duration indicates a third time that a third satellite of the plurality of satellites turns on a third beam and a fourth time that the third satellite turns off the third beam; and
by the first user terminal, identifying a target beam for handover of the first user terminal based on the neighbor cell list that was received from the ground network of the satellite communication system via the at least one wireless satellite link.

13. The method of claim 12, wherein the neighbor cell list includes at least one start angle and span for the plurality of satellites.

14. The method of claim 12, further comprising:
receiving a signal via the identified target beam.

15. The method of claim 13, wherein the at least one start angle and span is for at least one elevation angle.

16. The method of claim 13, wherein the at least one start angle and span is for at least one azimuth angle.

17. The method of claim 13, wherein the at least one start angle and span is for at least one yaw angle.

18. The method of claim 12, wherein the identification of the target beam comprises searching for at least one cell associated with the plurality of satellites.

19. The method of claim 12, wherein:
the neighbor cell list comprises satellite attitude information; and
the neighbor cell list comprises satellite illumination information that includes at least one start angle and span.

20. The method of claim 19, wherein the identification of the target beam comprises:
  by the first user terminal, identifying a set of satellites for which satellite attitude and illumination information is available at the first user terminal; and
  by the first user terminal, identifying a particular satellite of the set of satellites that provides coverage for the first user terminal.

21. The method of claim 20, wherein the identification of the set of satellites comprises identifying at least one satellite of the plurality of satellites at locations to which the first user terminal is able to point an antenna.

22. The method of claim 21, wherein the identification of the particular satellite that provides coverage for the first user terminal comprises identifying at least one second satellite of the identified at least one satellite that can currently provide coverage for the first user terminal.

23. The method of claim 20, wherein the identification of the particular satellite that provides coverage for the first user terminal comprises:
  identifying a first plurality of satellites of the set of satellites that can currently provide coverage for the first user terminal;
  identifying a plurality of orbital planes upon which the first plurality of satellites lie;
  identifying an orbital plane of the plurality of orbital planes that is closest to the first user terminal; and
  identifying one satellite of any satellites on the identified orbital plane that is closest to the first user terminal.

24. A first user terminal comprising:
  a memory; and
  a processor coupled to the memory,
  the processor and the memory configured to:
    receive, from a ground network of a satellite communication system via at least one wireless satellite link, a broadcast information block (BIB) message comprising a neighbor cell list, wherein the BIB message comprises a quantity of segments, each segment comprising a corresponding portion of the neighbor cell list and a corresponding sequence number relating to the corresponding portion of the neighbor cell list, wherein the neighbor cell list identifies a plurality of cells that are candidates for cell reselection for at least one user terminal including the first user terminal that is under a footprint of a first beam of a first satellite of a plurality of satellites, wherein the neighbor cell list comprises a first ON duration of a first cell of the plurality of cells and a second ON duration of a second cell of the plurality of cells, wherein the first ON duration indicates a first time that a second satellite of the plurality of satellites turns on a second beam and a second time that the second satellite turns off the second beam, and wherein the second ON duration indicates a third time that a third satellite of the plurality of satellites turns on a third beam and a fourth time that the third satellite turns off the third beam; and
    identify a target beam for handover of the first user terminal based on the neighbor cell list that was received from the ground network of the satellite communication system via the at least one wireless satellite link.

25. The apparatus of claim 24, wherein:
  the neighbor cell list includes at least one start angle and span for the plurality of satellites; and
  the at least one start angle and span is for at least one of: an elevation angle, an azimuth angle, a yaw angle, or any combination thereof.

26. The apparatus of claim 24, wherein the identification of the target beam comprises a search for at least one cell associated with the plurality of satellites.

27. A method of communication, comprising:
  by a ground network of a satellite communication system, determining a neighbor cell list that identifies a plurality of cells that are candidates for cell reselection for at least one user terminal that is under a footprint of a first beam of a first satellite of a plurality of satellites, wherein the neighbor cell list comprises a first ON duration of a first cell of the plurality of cells and a second ON duration of a second cell of the plurality of cells, wherein the first ON duration indicates a first time that a second satellite of the plurality of satellites turns on a second beam and a second time that the second satellite turns off the second beam, and wherein the second ON duration indicates a third time that a third satellite of the plurality of satellites turns on a third beam and a fourth time that the third satellite turns off the third beam; and
  by the ground network of the satellite communication system, sending, via a first wireless satellite link, a broadcast information block (BIB) message comprising the neighbor cell list to a fourth satellite of the plurality of satellites configured to send, via the first beam and a second wireless satellite link different from the first wireless satellite link, the broadcast information block (BIB) message comprising the neighbor cell list to a first user terminal of the plurality of user terminals, wherein the BIB message comprises a quantity of segments, each segment comprising a corresponding portion of the neighbor cell list and a corresponding sequence number relating to the corresponding portion of the neighbor cell list.

* * * * *